US010397390B2

(12) United States Patent
Li et al.

(10) Patent No.: US 10,397,390 B2
(45) Date of Patent: Aug. 27, 2019

(54) COMMUNICATION EVENT TRANSFER METHOD AND APPARATUS, COMMUNICATION EVENT PROCESSING METHOD AND APPARATUS, AND TERMINAL

(71) Applicant: Huawei Technologies Co., Ltd., Shenzhen (CN)

(72) Inventors: Yan Li, Shenzhen (CN); Linyi Gao, Beijing (CN); Yu Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/754,503

(22) PCT Filed: Dec. 4, 2015

(86) PCT No.: PCT/CN2015/096410
§ 371 (c)(1),
(2) Date: Feb. 22, 2018

(87) PCT Pub. No.: WO2017/092032
PCT Pub. Date: Jun. 8, 2017

(65) Prior Publication Data
US 2018/0248992 A1     Aug. 30, 2018

(51) Int. Cl.
*H04M 1/723* (2006.01)
*H04B 5/00* (2006.01)
(Continued)

(52) U.S. Cl.
CPC ........... *H04M 1/7253* (2013.01); *H04M 1/73* (2013.01); *H04M 19/08* (2013.01);
(Continued)

(58) Field of Classification Search
CPC ...... H04M 1/7253; H04M 19/08; H04M 1/73; H04M 1/72569; H04M 2250/02;
(Continued)

(56) References Cited

U.S. PATENT DOCUMENTS 9,247,007 B2 * 1/2016 Prestenback ............ H04L 67/16
2004/0213212 A1 * 10/2004 Reding ................. H04M 3/387
370/352

(Continued)

FOREIGN PATENT DOCUMENTS

| CN | 102783091 A | 11/2012 |
| CN | 104967557 A | 10/2015 |
| CN | 105050075 A | 11/2015 |

OTHER PUBLICATIONS

Machine Translation and Abstract of Chinese Publication No. CN105050075, Nov. 11, 2015, 18 pages.
(Continued)

*Primary Examiner* — Andrew Wendell
(74) *Attorney, Agent, or Firm* — Conley Rose, P.C.

(57) ABSTRACT

A communication event processing method includes obtaining, by a first terminal, a use status of the first terminal and a use status of a second terminal. The method includes determining either the first terminal or the second terminal as a communication event receiving terminal according to at least one of the use status of the first terminal or the use status of the second terminal. The method includes sending, by the first terminal, a communication event transfer start instruction message to a server when the communication event receiving terminal is the second terminal and a communication event receiving terminal determined last time is the first terminal, where the communication event transfer start instruction message is used to instruct the server to
(Continued)

forward, to the second terminal, a received communication event to be sent to the first terminal.

17 Claims, 12 Drawing Sheets

(51) Int. Cl.
*H04M 1/725* (2006.01)
*H04M 1/73* (2006.01)
*H04M 19/08* (2006.01)

(52) U.S. Cl.
CPC .... *H04M 1/72547* (2013.01); *H04M 1/72569* (2013.01); *H04M 2250/02* (2013.01)

(58) Field of Classification Search
CPC . H04M 1/72547; H04B 5/0031; H04B 17/23; H04W 4/80
See application file for complete search history.

(56) References Cited

U.S. PATENT DOCUMENTS

| | | |
|---|---|---|
| 2012/0040611 A1 | 2/2012 | Griffin et al. |
| 2015/0061862 A1* | 3/2015 | Lee ..................... H04W 1/7253 340/539.11 |
| 2015/0201085 A1 | 7/2015 | Setton et al. |
| 2015/0296480 A1* | 10/2015 | Kinsey .................... H04W 4/80 455/41.3 |
| 2016/0065630 A1* | 3/2016 | Gupta ................... G06F 16/955 709/204 |
| 2016/0198322 A1* | 7/2016 | Pitis ........................ H04W 4/18 455/420 |
| 2016/0360344 A1* | 12/2016 | Shim .................. H04L 12/2816 |
| 2017/0185052 A1 | 6/2017 | Wang |

OTHER PUBLICATIONS

Foreign Communication From a Counterpart Application, PCT Application No. PCT/CN2015/096410, English Translation of International Search Report dated Aug. 19, 2016, 2 pages.

* cited by examiner

COMMUNICATION EVENT TRANSFER METHOD AND APPARATUS, COMMUNICATION EVENT PROCESSING METHOD AND APPARATUS, AND TERMINAL

CROSS-REFERENCE TO RELATED APPLICATION

This application is a national stage of International Application No. PCT/CN2015/096410, filed on Dec. 4, 2015, which is hereby incorporated by reference in its entirety.

TECHNICAL FIELD

The present disclosure relates to the field of communications technologies, and in particular, to a communication event transfer method and apparatus, a communication event processing method and apparatus, and a terminal.

BACKGROUND

With booming development of communications technologies, terminal devices also tend to be diversified. In addition to a most common mobile phone, the terminal devices further include various wearable devices such as a smart band and a smartwatch. These wearable devices also have a communication function.

Currently, there is a communication method based on a wearable device. In the method, a wearable device is connected to a mobile phone by using BLUETOOTH, and can communicate with the mobile phone. After receiving a new communication event (including an incoming call message, a short message service message, or the like), an operator server sends the communication event to the mobile phone. The mobile phone determines, according to a status of the mobile phone, whether to transfer the communication event to the wearable device connected to the mobile phone by using BLUETOOTH. For example, if the mobile phone is not being used currently, the mobile phone sends the communication event to the wearable device by using a technology such as BLUETOOTH. If the mobile phone is being used currently, the mobile phone directly displays the communication event to a user.

However, determining, only according to whether a mobile phone is used, whether a communication event is transferred cannot ensure that a user can see the communication event in a timely manner.

SUMMARY

To resolve a prior-art problem, embodiments of the present disclosure provide a communication event transfer method and apparatus, a communication event processing method and apparatus, and a terminal. The technical solutions are as follows.

According to a first aspect, an embodiment of the present disclosure provides a communication event transfer method, where the method includes: obtaining, by a first terminal, a use status of the first terminal and a use status of a second terminal; determining, by the first terminal, either the first terminal or the second terminal as a communication event receiving terminal according to at least one of the use status of the first terminal or the use status of the second terminal; and when the communication event receiving terminal is the second terminal and a communication event receiving terminal determined last time is the first terminal, sending, by the first terminal, a communication event transfer start instruction message to a server, where the communication event transfer start instruction message is used to instruct the server to forward, to the second terminal, a received communication event to be sent to the first terminal.

In this embodiment of the present disclosure, the first terminal determines the communication event receiving terminal according to the use status of the first terminal and the use status of the second terminal, and determines, according to the determined communication event receiving terminal, whether to instruct the server to forward, to the second terminal, the communication event to be sent to the first terminal. The use statuses of the two terminals are both considered, so as to increase a probability that a user sees the communication event in a timely manner, and to better meet an actual usage requirement of the user.

Optionally, the method further includes: when the communication event receiving terminal is the first terminal and a communication event receiving terminal determined last time is the second terminal, sending, by the first terminal, a communication event transfer stop instruction message to a server, where the communication event transfer stop instruction message is used to instruct the server to stop forwarding, to the second terminal, a communication event to be sent to the first terminal.

When it is determined that the first terminal needs to receive the communication event, the communication event transfer stop instruction message is sent to the server, to instruct the server not to transfer the communication event, but to send, to the first terminal, the communication event to be sent to the first terminal.

Optionally, the second terminal may have one communication number, or may have at least two communication numbers, and the at least two communication numbers belong to different operators respectively. When the second terminal has at least two communication numbers, the method may further include: after the first terminal sends a communication event transfer start instruction message to the server, when a communication number used by the second terminal changes, obtaining, by the first terminal, a communication number currently used by the second terminal; and sending, by the first terminal, a communication number change instruction message to the server, where the communication number change instruction message is used to instruct the server to forward, to the second terminal by using the communication number currently used by the second terminal, a received communication event to be sent to the first terminal.

The first terminal monitors whether the communication number of the second terminal changes, and notifies the server in a timely manner when the communication number used by the second terminal changes, so as to ensure that the server can successfully forward, to the second terminal, the communication event to be sent to the first terminal.

Optionally, the method includes: obtaining, by the first terminal, scenario information of the first terminal; and determining, by the first terminal according to the use status of the first terminal, the use status of the second terminal, and the scenario information, whether to forward the received communication event to the second terminal.

After the first terminal receives the communication event, secondary determining is performed on a terminal that displays the communication event with reference to a scenario of a user, so as to better meet a user's requirement.

In an implementation of the first aspect, the determining, by the first terminal, either the first terminal or the second terminal as a communication event receiving terminal according to at least one of the use status of the first terminal or the use status of the second terminal includes: when the use status of the first terminal is a state of being used by a user, determining, by the first terminal, that the communication event receiving terminal is the first terminal; or when the use status of the second terminal is a state of being used by a user, determining, by the first terminal, that the communication event receiving terminal is the second terminal; or when both the use status of the first terminal and the use status of the second terminal are a state of being used by a user, determining, by the first terminal, either the first terminal or the second terminal as the communication event receiving terminal according to identity information of a current user of the first terminal and identity information of a current user of the second terminal.

Optionally, the determining, by the first terminal, either the first terminal or the second terminal as the communication event receiving terminal according to identity information of a current user of the first terminal and identity information of a current user of the second terminal includes: selecting, by the first terminal, a terminal whose current-user identity information is the same as preset user identity information, as the communication event receiving terminal; or when both the identity information of the current user of the first terminal and the identity information of the current user of the second terminal are the same as preset user identity information, using, by the first terminal, the first terminal as the communication event receiving terminal; or when both the identity information of the current user of the first terminal and the identity information of the current user of the second terminal are the same as preset user identity information, determining, by the first terminal, the communication event receiving terminal according to the scenario information of the first terminal.

According to a second aspect, an embodiment of the present disclosure provides a communication event processing method, where the method includes: obtaining, by a first terminal, a use status of the first terminal and a use status of a second terminal; determining, by the first terminal, either the first terminal or the second terminal as a communication event alert terminal according to at least one of the use status of the first terminal or the use status of the second terminal, where the communication event alert terminal is configured to receive a communication event to be sent to the first terminal and/or the second terminal and display the communication event to a user; and sending, by the first terminal, a notification message to the second terminal, where the notification message is used to notify the second terminal of information about the communication event alert terminal.

In this embodiment of the present disclosure, the first terminal determines the communication event alert terminal according to the use status of the first terminal and the use status of second terminal, and the communication event alert terminal receives a communication event and displays the received communication event to the user. The use statuses of the two terminals are both considered, so as to increase a probability that the user sees the communication event in a timely manner, and to better meet an actual usage requirement of the user.

Optionally, the method further includes: when the communication event alert terminal is the first terminal, skipping, by the second terminal, receiving a communication event, or receiving a communication event without a prompt; or when the communication event alert terminal is the second terminal, skipping, by the first terminal, receiving a communication event, or receiving a communication event without a prompt; or when the communication event alert terminal is the second terminal, and the first terminal determines, according to location information of the first terminal and location information of the second terminal, that a distance between the first terminal and the second terminal is less than a specified value, receiving, by both the first terminal and the second terminal, the communication event and displaying the communication event to the user.

During implementation, both the first terminal and the second terminal may receive the communication event, but only the communication event alert terminal displays the communication event to the user; or only the communication event alert terminal receives the communication event and displays the received communication event to the user, and a non communication event alert terminal skips receiving the communication event. For example, a mobile communications module of the non communication event alert terminal is set to a low power consumption state, and the mobile communications module is woken up when the terminal needs to receive the communication event; in this case, information is transmitted between the first terminal and the second terminal by using a nonmobile communications network, for example, a BLUETOOTH connection.

In the method of the second aspect, for a manner of determining the communication event alert terminal according to the use status of the first terminal and the use status of the second terminal, refer to a manner of determining the communication event receiving terminal in the method of the first aspect, and detailed descriptions are omitted herein.

In some embodiments, the obtaining, by the first terminal, a use status of the first terminal includes: obtaining usage data of the first terminal, where the usage data of the first terminal includes at least one of: data about one or more sensors, touchscreen use status data, or communications interface traffic data of the first terminal; and determining, according to the obtained usage data, that the use status of the first terminal is a state of being used by a user or a state of not being used by a user.

The obtaining, by the first terminal, a use status of the second terminal includes: receiving a notification message that is used to describe the use status of the second terminal and that is sent by the second terminal, where the use status of the second terminal is determined by the second terminal according to at least one of: data about one or more sensors, touchscreen use status data, or communications interface traffic data of the second terminal, and the use status of the second terminal includes a state of being used by a user or a state of not being used by a user; and obtaining the use status of the second terminal according to the notification message.

According to a third aspect, an embodiment of the present disclosure provides a communication event transfer apparatus, where the apparatus includes units configured to execute the method in the first aspect, for example, a status obtaining unit, a terminal determining unit, and a sending unit.

According to a fourth aspect, an embodiment of the present disclosure provides a communication event processing apparatus, where the apparatus includes units configured to execute the method in the second aspect, for example, a status obtaining unit, a terminal determining unit, and a sending unit.

According to a fifth aspect, an embodiment of the present disclosure provides a terminal, where the terminal includes a storage unit, a communications unit, and a processor unit connected to the storage unit and the communications unit, the storage unit is configured to store a software program and module, and the processor unit is configured to run or execute the software program and/or module stored in the storage unit. When running or executing the software program and/or module stored in the storage unit, the processor unit may execute the method in the first aspect.

According to a sixth aspect, an embodiment of the present disclosure provides a terminal, where the terminal includes a storage unit, a communications unit, and a processor unit connected to the storage unit and the communications unit; the storage unit is configured to store a software program and module, and the processor unit is configured to run or execute the software program and/or module stored in the storage unit. When running or executing the software program and/or module stored in the storage unit, the processor unit may execute the method in the second aspect.

According to a seventh aspect, an embodiment of the present disclosure provides a computer readable medium, configured to store a program code to be executed by a communication event transfer apparatus, where the program code includes an instruction for executing the method in the first aspect.

According to an eighth aspect, an embodiment of the present disclosure provides a computer readable medium, configured to store a program code to be executed by a communication event processing apparatus, where the program code includes an instruction for executing the method in the second aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
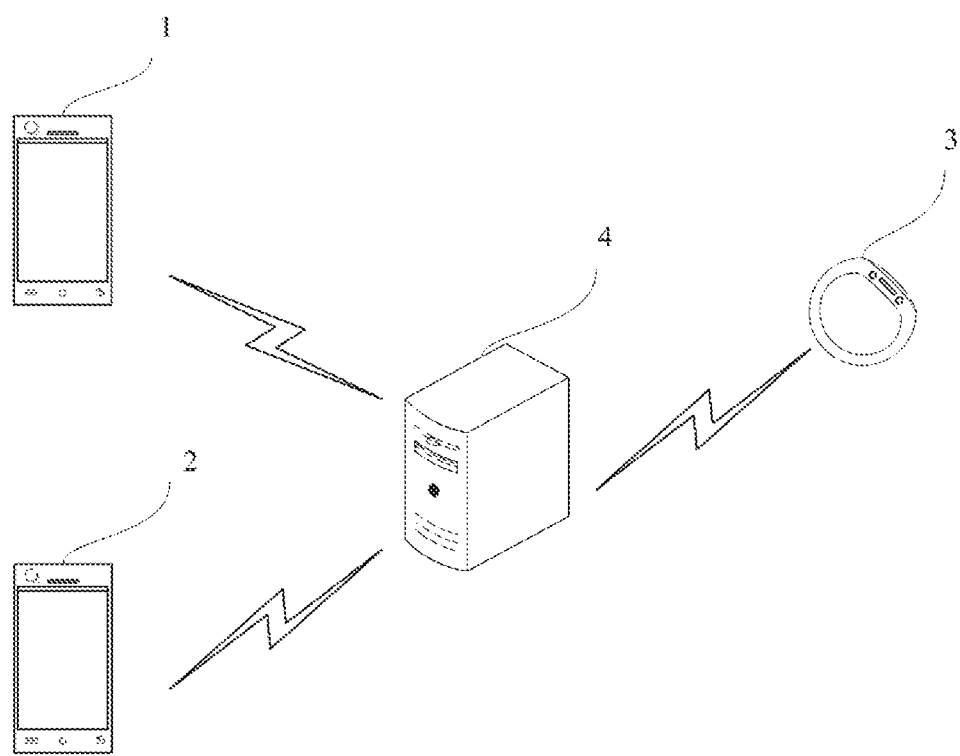
FIG. 1 is a schematic diagram of an application architecture of a communication event transfer method according to an embodiment of the present disclosure.

FIG. 1 is a schematic diagram of an application architecture of a method according to an embodiment of the present disclosure. As shown in FIG. 1, a mobile phone 1, a mobile phone 2, and a wearable device 3 are separately connected to an operator server 4 by using a mobile communications network. The mobile communications network includes but is not limited to Global System for Mobile Communications (GSM) system, a Code Division Multiple Access (CDMA) system, a Wideband Code Division Multiple Access (WCDMA) system, a General Packet Radio Service (GPRS), a Universal Mobile Telecommunications System (UMTS), a Worldwide Interoperability for Microwave Access (WiMAX) communications system, or a Long Term Evolution (LTE) communications system.

An operator is a provider that provides mobile communications network services, such as China Unicom, China Telecom, or China Mobile.

It should be noted that a quantity of terminals and a terminal type that are shown in FIG. 1 are merely examples, and no limitation is imposed thereon in the present disclosure. The terminal in this embodiment of the present disclosure may alternatively be a tablet computer, a palmtop computer, or the like. In addition, in this embodiment of the present disclosure, the wearable device includes but is not limited to a smartwatch, a smart band, smart glasses, a smart accessory, or the like.

Assuming that the mobile phone 1 in FIG. 1 belongs to a user and the mobile phone 2 and the wearable device 3 belong to another user, the two users may use the mobile phone 1, the mobile phone 2, and the wearable device 3 to perform communication in the following several situations.

In a first situation, a respective unique communication number is configured for each of the mobile phone 1, the mobile phone 2, and the wearable device 3. The mobile phone 1 may call a communication number of the mobile phone 2, and the operator server 4 sends a call message to the mobile phone 2. If the mobile phone 2 answers a call, communication is established between the mobile phone 1 and the mobile phone 2. The mobile phone 1 may further call a communication number of the wearable device 3, and the operator server 4 sends a call message to the wearable device 3. If the wearable device 3 answers a call, communication is established between the mobile phone 1 and the wearable device 3.

The mobile phone 1 may further send a short message service message to the communication number of the mobile phone 2. The short message service message to be sent by the mobile phone 1 to the mobile phone 2 is first sent to the operator server 4 and then forwarded by the operator server 4 to the mobile phone 2. Similarly, the mobile phone 1 may also send a short message service message to the communication number of the wearable device 3. The short message service message to be sent by the mobile phone 1 to the wearable device 3 is first sent to the operator server 4 and then forwarded by the operator server 4 to the wearable device 3.

Alternatively, a nonmobile communications network such as a BLUETOOTH technology or a Wireless Fidelity (WIFI) technology may be used to establish a wireless connection between the mobile phone 2 and the wearable device 3, and communication is performed directly by using the technology.

The operator server 4 may further transfer, to the wearable device 3, a communication event (including a call message or short message service message) to be sent to the mobile phone 2, and the wearable device 3 receives the communication event; or the operator server 4 transfers, to the mobile phone 2, a communication event to be sent to the wearable device 3, and the mobile phone 2 receives the communication event. In this embodiment of the present disclosure, whether to transfer a communication event is determined according to a use status of the mobile phone 2 and a use status of the wearable device 3, and a specific determining manner is described in detail in the following.

In a second situation, at least one of the mobile phone 2 or the wearable device 3 may have at least two communication numbers, and different communication numbers are corresponding to different operators. A terminal (the mobile phone 2 or the wearable device 3) that has at least two communication numbers can use only one communication number at a time. In this case, for a process of communication between the mobile phone 1, the mobile phone 2, and the wearable device 3, refer to the first situation.

In a third situation, the mobile phone 2 and the wearable device 3 share one communication number, and the operator server 4 considers the mobile phone 2 and the wearable device 3 as one user. When receiving a communication event to be sent to the communication number, the operator server 4 directly sends the communication event to the communication number. The mobile phone 2 and the wearable device 3 determine on their own whether to receive the communication event or whether to display the received communication event.

In the following embodiments, descriptions are provided by using the mobile phone 2 as a first terminal and the wearable device 3 as a second terminal. It should be noted that the mobile phone 2 and the wearable device 3 are interchangeable, that is, the wearable device 3 is used as the first terminal and the mobile phone 2 is used as the second terminal. Alternatively, another terminal such as a tablet computer may be used as the first terminal or the second terminal.

Figure 2:
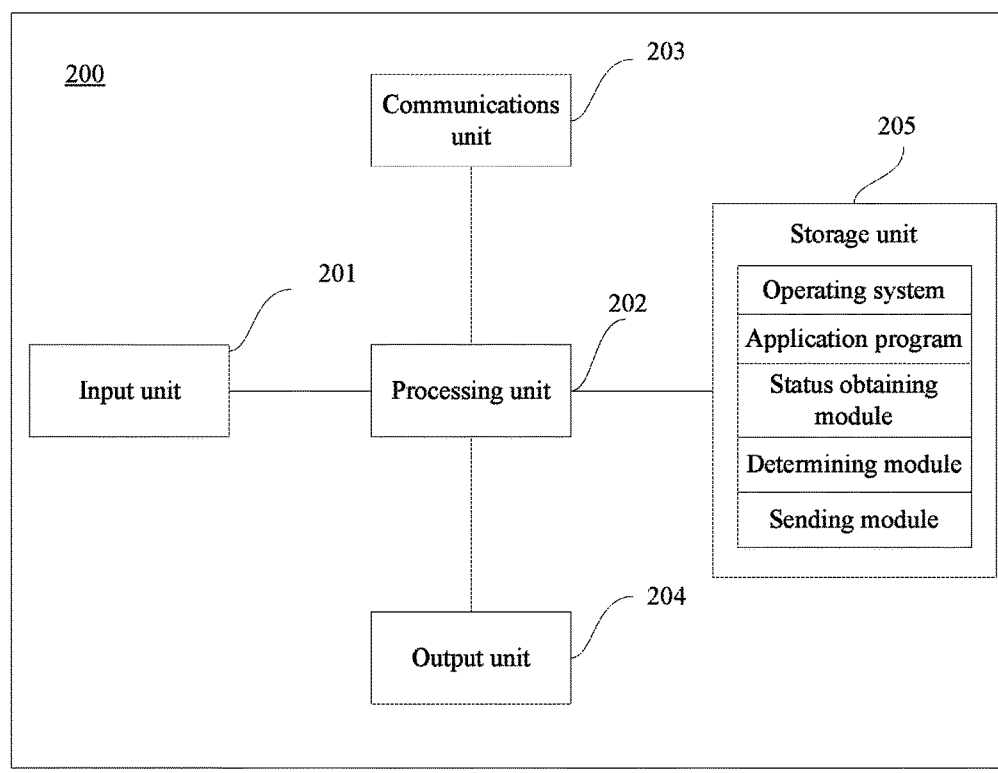
FIG. 2 is a structural block diagram of a terminal according to an embodiment of the present disclosure.

The mobile phone 1, the mobile phone 2, and/or the wearable device 3 in FIG. 1 may be implemented by using a terminal device 200 shown in FIG. 2. FIG. 2 is a structural block diagram of the terminal device 200. The terminal device 200 includes components such as an input unit 201, a processor unit 202, a communications unit 203, an output unit 204, and a storage unit 205. These components perform communication by using one or more buses. A person skilled in the art may understand that a structure of the terminal device shown in the figure does not impose a limitation on the present disclosure. The terminal device may have a bus-shaped structure or a star-shaped structure, or may include more or less components than those shown in the figure, or a combination of some components, or components deployed differently.

The input unit 201 is configured to implement interaction between a user and the terminal device and/or input information into the terminal device. For example, the input unit 201 may receive numeral or character information entered by the user, to generate signal input related to user setting or function control. In a specific implementation of the present disclosure, the input unit 201 may be a touch panel, may be another human-computer interaction interface, for example, a substantive input key or a microphone, or may be another external information capture apparatus, for example, a camera. The touch panel is also referred to as a touchscreen or a touch-control screen, and can collect an operation action performed by a user on or near the touch panel, for example, an operation action performed by the user on or near the touch panel with a finger or by using any proper object or accessory such as a stylus, and drive a corresponding connection apparatus according to a preset program. Optionally, the touch panel may include two components: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into contact coordinates, and then sends the contact coordinates to the processing unit. The touch controller may further receive and execute a command sent by the processing unit. In addition, the touch panel may be implemented in multiple types, such as a resistive type, a capacitive type, an infrared (Infrared) type, and a surface acoustic wave type. In another implementation of the present disclosure, a substantive input key used as the input unit may include but is not limited to one or more of a physical keyboard, a function key (for example, a volume control key or an on/off key), a trackball, a mouse, or a joystick. The input unit in a form of a microphone may collect voice input by a user or from an environment and convert the voice into a command that is in a form of an electrical signal and that can be executed by the processing unit.

In some other implementations of the present disclosure, the input unit 201 may alternatively be various types of sensing devices, such as a Hall device, configured to detect a physical quantity of the terminal device such as force, torque, pressure, stress, a location, displacement, a speed, acceleration, an angle, an angular speed, a revolution, a rotation speed, or a working state change time, and convert the physical quantity into an electric quantity to perform detection and control. Some other sensing devices may further include a gravity sensor, a tri-axis accelerometer, a gyroscope, or the like.

The processor unit 202 is a control center of the terminal device 200, and is connected to all components of the entire terminal device 200 by using various interfaces and lines. The processor unit 202 runs or executes a software program and/or module stored in the storage unit 205 and invokes data stored in the storage unit 205, so as to implement various functions of the terminal device 200 and/or processes data. The processor unit 202 may include an integrated circuit (IC), for example, may include a single packaged IC, or may include multiple packaged ICs that have same or different functions and that are connected. For example, the processor unit 202 may include only a central processing unit (CPU), or may be a combination of a graphics processing unit (GPU), a digital signal processor (DSP), or a control chip (for example, a baseband chip) that is in the communications unit 203. In an implementation of the present disclosure, the CPU may be a single computing core, or may include multiple computing cores.

The communications unit 203 is configured to establish a communication channel, so that the terminal device connects to a remote server by using the communication channel and downloads media data from the remote server. The communications unit 203 may include a communications module such as a wireless local area network (wireless LAN) module, a BLUETOOTH module, or a baseband (Base Band) module, and a radio frequency (RF) circuit corresponding to the communications module, and is configured to perform wireless local area network communication, BLUETOOTH communication, infrared communication, and/or cellular communications system communication, for example, Wideband Code Division Multiple Access (W-CDMA) and/or high speed downlink packet access (HSDPA). The communications unit 203 is configured to control communication between all components of the terminal device 200, and may support direct memory access.

In a different implementation of the present disclosure, all communications modules of the communications unit 203 are generally presented in a form of an integrated circuit chip, and may be selectively combined, without requiring that all the communications modules and corresponding antenna groups be included. For example, the communications unit 203 may include only a baseband chip, a radio frequency chip, and a corresponding antenna, to provide a communication function in a cellular communications system. By means of a wireless communication connection established by the communications unit, for example, wireless local area network access or WCDMA access, the terminal device 200 may be connected to a cellular network or the Internet. In some optional implementations of the present disclosure, the communications module, for example, a baseband module, of the communications unit 203 may be integrated into the processor unit. A typical example is an APQ+MDM series platform provided by Qualcomm.

The radio frequency circuit is configured to receive and send information or receive and send a signal during a call. For example, after receiving downlink information from a base station, the radio frequency circuit sends the downlink information to the processing unit for processing. In addition, the radio frequency circuit sends uplink data to the base station. Generally, the radio frequency circuit includes a well-known circuit configured to implement these functions, including but not limited to an antenna system, a radio frequency transceiver, one or more amplifiers, a tuner, one or more oscillators, a digital signal processor, a codec (Codec) chip set, a subscriber identity module (SIM) card, a memory, and the like. In addition, the radio frequency circuit may further communicate with a network and another device by means of wireless communication. For the wireless communication, any communications standard or protocol may be used and includes but is not limited to GSM, GPRS, CDMA, WCDMA, High Speed Uplink Packet Access technology (HSUPA), WiMAX, LTE, an email, a short message service (SMS), or the like.

The output unit 204 includes but is not limited to an image output unit and a sound output unit. The image output unit is configured to output text, an image, and/or a video. The image output unit may include a display panel, for example, a display panel configured in a form of a liquid crystal display (LCD), an organic light-emitting diode (OLED), a field emission display (FED), or the like. Alternatively, the image output unit may include a reflective display, for example, an electrophoretic display, or a display using an interferometric modulation of light technology (Interferometric Modulation of Light). The image output unit may include a single display or multiple displays of different dimensions. In a specific implementation of the present disclosure, a touch panel used as the input unit 201 may also be used as the display panel of the output unit. For example, after detecting a gesture operation performed on or near the touch panel, the touch panel transmits information about the gesture operation to the processing unit to determine a touch event type, and then the processing unit provides corresponding visual output on the display panel according to the touch event type. In FIG. 2, although the input unit 201 and the output unit 204 are used as two separate components to implement input and output functions of the terminal device 200, in some embodiments, the touch panel and the display panel may be integrated as a whole to implement the input and output functions of the terminal device. For example, the image output unit may display various graphical user interfaces (GUI) as virtual control components, including but not limited to a window, a scrollbar, an icon, and a scrapbook, for a user to perform an operation by means of touch.

In a specific implementation of the present disclosure, the image output unit includes a filter and an amplifier configured to perform filtering on and zoom in a video output by the processing unit 202. The audio output unit includes a digital-to-analog converter configured to convert an audio signal, output by the processing unit 202, from a digital format to an analog format.

The storage unit 205 may be configured to store a software program and module. The processing unit 202 runs the software program and module stored in the storage unit 205, so as to execute various function applications of the terminal device 200 and process data. The storage unit 205 mainly includes a program storage area and a data storage area. The program storage area may store an operating system and an application program required by at least one function, for example, a sound playback program or an image playback program. The data storage area may store data (for example, audio data or a phone book) or the like created according to usage of the terminal device 200. In a specific implementation of the present disclosure, the storage unit 205 may include a volatile memory, for example, a nonvolatile random access memory (NVRAM), a phase change random access memory (Phase Change RAM or PRAM), or a magnetoresistive random access memory (Magnetoresistive RAM or MRAM); or may include a nonvolatile memory, for example, at least one disk storage device, an electrically erasable programmable read-only memory (EEPROM), or a flash memory such as NOR flash memory or NAND flash memory. The nonvolatile memory stores the operating system on which the processing unit runs and the application program that is executed by the processing unit. The processing unit 202 loads a running program and data from the nonvolatile memory to a memory, and stores digital content in a large-capacity storage apparatus. The operating system includes various components and/or drivers that are configured to control and manage a conventional system task, for example, memory management, storage device control, or power management, and that are conducive to communication between software and hardware. In this implementation of the present disclosure, the operating system may be an Android system of Google, an iOS system developed by Apple, a Windows operating system developed by Microsoft, or an embedded operating system such as Vxworks.

The application program includes any application installed on the terminal device, and includes but is not limited to a browser, an email, an instant messaging service, word processing, keyboard virtualization, a widget (Widget), encryption, digital copyright management, speech recognition, speech duplication, positioning (for example, a function provided by a global positioning system), music playback, and the like.

As shown in FIG. 2, the storage unit 205 of the terminal device 200 stores communication event transfer or processing programs, an operating system kernel, and one or more software modules (for example, a status obtaining module, a terminal determining module, or a sending module). The terminal device 200 may run one or more of the communication event transfer or processing programs and execute the one or more software modules in this embodiment of the present disclosure, so as to transfer a communication event. The one or more software modules may be integrated in the operating system kernel or may be a plugin of the operating system kernel.

By executing the one or more software modules, the terminal device 200 may execute a communication event transfer method or a communication event processing method (referring to an embodiment shown in any one of FIG. 3 to FIG. 7 or FIG. 9 to FIG. 11) provided in an embodiment of the present disclosure.

Figure 3:
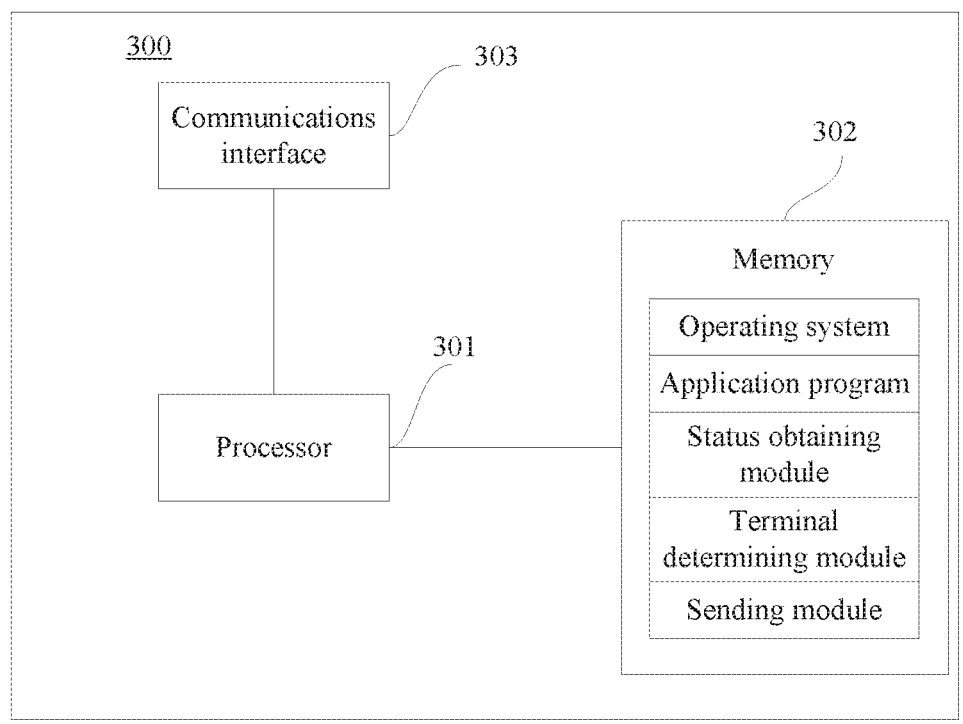
FIG. 3 is a structural block diagram of a server according to an embodiment of the present disclosure.

The operator server 4 in FIG. 1 may be implemented by using a computer device 300 shown in FIG. 3. FIG. 3 is a structural block diagram of the computer device 300. The computer device 300 includes components such as a processor 301, a memory 302, and a communications interface 303. These components perform communication by using one or more buses. A person skilled in the art may understand that a structure of the computer device shown in the figure does not impose a limitation on the present disclosure. The computer device may have a bus-shaped structure or a star-shaped structure, or may include more or less components than those shown in the figure, or a combination of some components, or components deployed differently.

The processor 301 is a control center of the computer device 300, and is connected to all components of the entire computer device 300 by using various interfaces and lines. The processor 301 runs or executes a software program and/or module stored in the memory 302 and invokes data stored in the memory 302, so as to implement various functions of the computer device 300 and/or processes data. The processor 301 may include an IC, for example, may include a single packaged IC, or may include multiple packaged ICs that have same or different functions and that are connected. For example, the processor 301 may include only a CPU, or may be a combination of a GPU and a DSP. In an implementation of the present disclosure, the CPU may be a single computing core, or may include multiple computing cores.

The memory 302 may be configured to store a software program and module. The processor 301 runs the software program and module stored in the memory 302, to implement various function applications of the computer device 300 and process data. The memory 302 may mainly include a program storage area and a data storage area. The program storage area may store an operating system 21 and an application program required by at least one function, for example, a sound playback function or an image playback function. The data storage area may store data (for example, a communication number of a terminal) or the like created according to usage of the computer device 300. The memory 302 may be implemented by any type of volatile or nonvolatile storage device or a combination thereof, such as an SRAM, an EEPROM, an EPROM, a PROM, a ROM, a magnetic memory, a flash memory, a magnetic disk, or an optical disk. Accordingly, the memory 302 may further include a memory controller to support access to the memory 302 by the processor 301. The nonvolatile memory stores the operating system on which the processor runs and the application program that is executed by the processor. The processor 301 loads a running program and data from the nonvolatile memory to the memory, and stores digital content into a large-capacity storage apparatus. The operating system includes various components and/or drivers that are configured to control and manage a conventional system task, for example, memory management, storage device control, or power management, and that are conducive to communication between software and hardware.

The application program includes any application installed on the computer device, and includes but is not limited to a browser, an email, an instant messaging service, word processing, keyboard virtualization, a widget (Widget), encryption, digital copyright management, speech recognition, speech duplication, music playback, or the like.

As shown in FIG. 3, the memory 302 of the computer device 300 stores a communication event transfer programs, an operating system kernel, and one or more software modules (for example, a status obtaining module, a terminal determining module, or a sending module). The computer device 300 may run one or more of the communication event transfer programs and execute the one or more software modules in this embodiment of the present disclosure, so as to transfer a communication event. The one or more software modules may be integrated in the operating system kernel or may be a plugin of the operating system kernel.

By executing the one or more software modules, the computer device 300 may execute a communication event transfer method (refer to an embodiment shown in FIG. 8) provided in an embodiment of the present disclosure.

Figure 4:
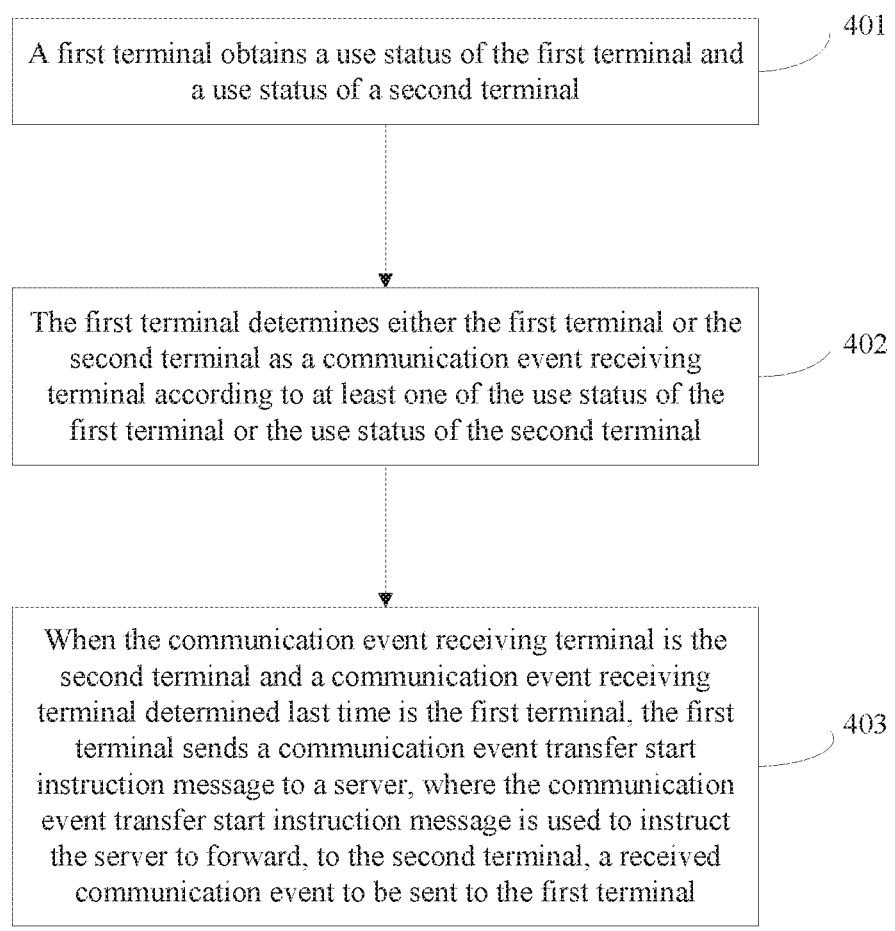
FIG. 4 is a flowchart of a communication event transfer method according to an embodiment of the present disclosure.

FIG. 4 is a flowchart of a communication event transfer method according to an embodiment of the present disclosure. The method may be executed by a first terminal, for example, the mobile phone 2 or the wearable device 3 in the foregoing scenario. As shown in FIG. 4, the method includes the following steps.

Step 401. The first terminal obtains a use status of the first terminal and a use status of a second terminal.

The obtaining, by the first terminal, a use status of the first terminal includes: obtaining, by the first terminal, usage data of the first terminal, where the usage data of the first terminal includes at least one of: data about one or more sensors, touchscreen use status data, or communications interface traffic data of the first terminal; and determining, by the first terminal according to the obtained usage data, that the use status of the first terminal is a state of being used by a user or a state of not being used by a user.

The obtaining, by the first terminal, a use status of a second terminal includes: receiving, by the first terminal, a notification message that is used to describe the use status of the second terminal and that is sent by the second terminal, where the use status of the second terminal is determined by the second terminal according to usage data of the second terminal, the usage data of the second terminal includes at least one of: data about one or more sensors, touchscreen use status data, or communications interface traffic data, and the use status of the second terminal includes a state of being used by a user or a state of not being used by a user; and obtaining, by the first terminal, the use status of the second terminal according to the notification message.

Step 402. The first terminal determines either the first terminal or the second terminal as a communication event receiving terminal according to at least one of the use status of the first terminal or the use status of the second terminal.

Step 403. When the communication event receiving terminal is the second terminal and a communication event receiving terminal determined last time is the first terminal, the first terminal sends a communication event transfer start instruction message to a server, where the communication event transfer start instruction message is used to instruct the server to forward, to the second terminal, a received communication event to be sent to the first terminal.

Optionally, the method may further include: when the communication event receiving terminal is the first terminal and a communication event receiving terminal determined last time is the second terminal, sending, by the first terminal, a communication event transfer stop instruction message to a server, where the communication event transfer stop instruction message is used to instruct the server to stop forwarding, to the second terminal, a communication event to be sent to the first terminal.

In this embodiment of the present disclosure, the first terminal determines the communication event receiving terminal according to the use status of the first terminal and the use status of the second terminal, and determines, according to the determined communication event receiving terminal, whether to instruct the server to forward, to the second terminal, the communication event to be sent to the first terminal. The use statuses of the two terminals are both considered, so as to increase a probability that the user sees the communication event in a timely manner, and to better meet an actual usage requirement of the user.

Figure 5:
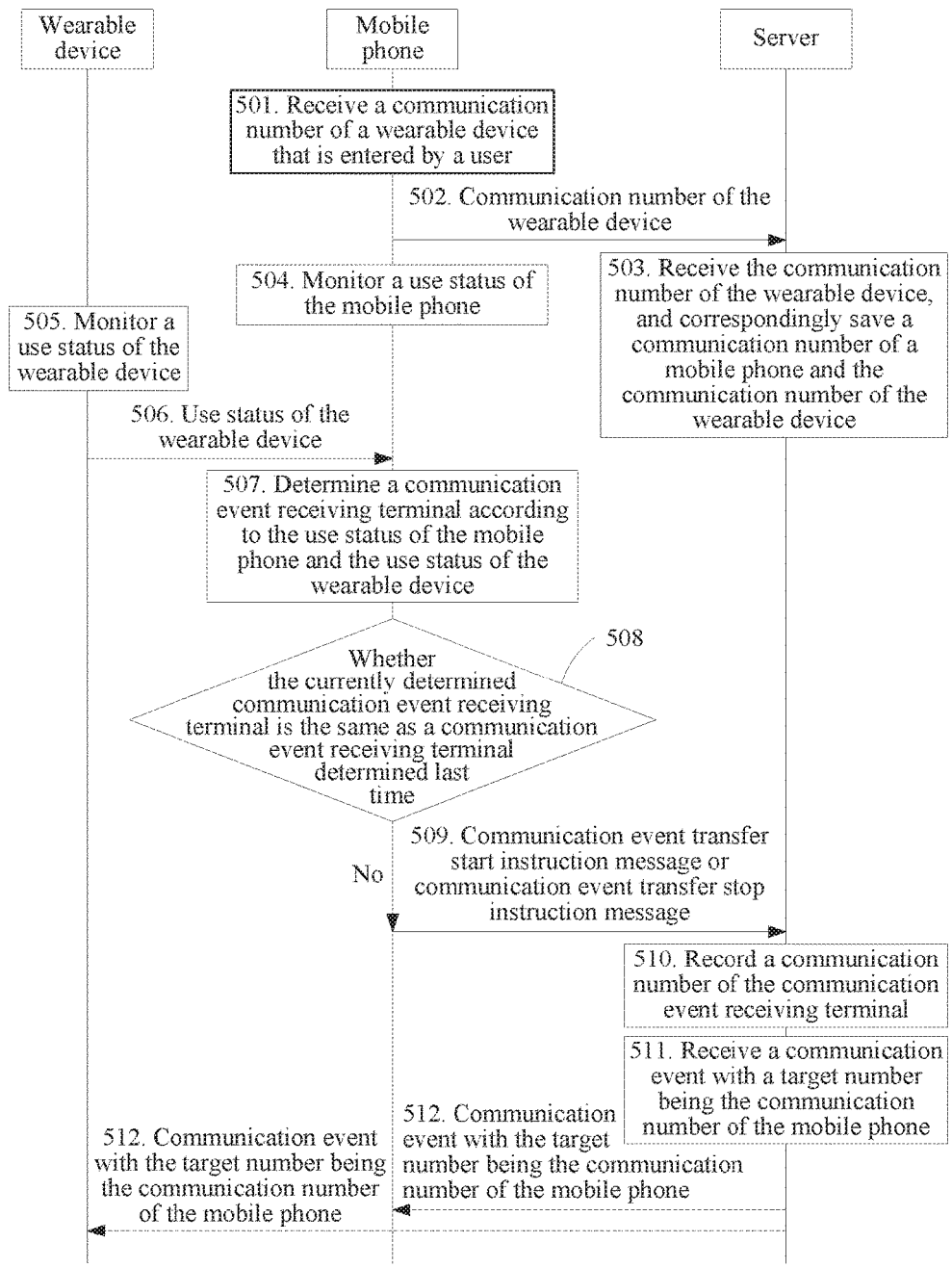
FIG. 5 is a flowchart of a communication event transfer method according to another embodiment of the present disclosure.

FIG. 5 is a flowchart of a communication event transfer method according to an embodiment of the present disclosure. In this embodiment, the communication event transfer method in this embodiment of the present disclosure is detailed by using an example in which a mobile phone (a first terminal) determines a communication event receiving terminal. In this embodiment, the mobile phone and a wearable device have a unique communication number each (which is corresponding to the first situation). As shown in FIG. 5, the method includes the following steps.

Step 501. The mobile phone receives a communication number of the wearable device that is entered by a user.

Step 502. The mobile phone sends the received communication number of the wearable device to a server.

Step 503. The server receives the communication number of the wearable device, and correspondingly saves a communication number of the mobile phone and the communication number of the wearable device.

Optionally, the server may save the communication number of the mobile phone and the communication number of the wearable device in a manner of a data pair, for example, <the communication number of the mobile phone, the communication number of the wearable device>, or may save a communication number of a corresponding mobile phone and a communication number of a wearable device in a form of a relationship table.

During implementation, the server may further save device information of the mobile phone, including but not limited to a Media Access Control (MAC) address, a device model, or the like.

Step 501 to step 503 may be used to subscribe to a service transfer function for the communication number of the mobile phone. Service transfer function subscription means that an operator service of the communication number of the mobile phone may be transferred to another communication number, for example, the communication number of the wearable device. However, it should be noted that service transfer function subscription means that after subscription for the communication number of the mobile phone with an operator, the server can verify, when receiving a request (for example, a service transfer request), whether the communication number of the mobile phone has a right to transfer a message of the communication number to another communication number corresponding to the communication number, instead of that the server directly transfers the operator service of the communication number of the mobile phone to the corresponding communication number after receiving the operator service of the communication number of the mobile phone.

The operator service includes a call service and a short message service. Operator service transfer is the foregoing communication event transfer.

In this embodiment, the mobile phone is used to subscribe to a service transfer function for the communication number of the mobile phone. However, in another embodiment, another terminal device (for example, a terminal device in a business hall) may be used to subscribe to the service transfer function for the communication number of the mobile phone. The another terminal device receives the communication number of the mobile phone and the communication number of the wearable device that are entered. In addition, the another terminal device sends the communication number of the mobile phone and the communication number of the wearable device to the server, and the server correspondingly saves the communication number of the mobile phone and the communication number of the wearable device.

It should be noted that step 501 to step 503 are optional steps.

Step 504. The mobile phone monitors a use status of the mobile phone.

Step 504 may include: obtaining usage data of the mobile phone, where the usage data of the mobile phone includes at least one of: data about one or more sensors, touchscreen use status data, or communications interface traffic data of the mobile phone; and determining, according to the obtained usage data of the mobile phone, that the use status of the mobile phone is a state of being used by a user or a state of not being used by a user.

The sensor includes but is not limited to a motion sensor, a GPS, a light sensor, a camera, a pressure sensor, a Hall effect sensor, a photoelectric sensor, a resistance sensor, a temperature sensor, a biosensor, or the like. The motion sensor includes but is not limited to an accelerometer, a gyroscope, a magnetometer, an altimeter, or the like. The biosensor includes but is not limited to an electrocardio sensor (for example, a photoplethysmography (PPG) sensor or an electro-cardiography (ECG) sensor), a blood pressure sensor, or the like.

The state of not being used by a user may mean that the mobile phone is in a black-screen state or a standby state, or the mobile phone detects no user operation within a specified period of time. The state of being used by a user may mean that the mobile phone is in a non-black-screen or standby state, or the user and the mobile phone are in an interactive state, that is, the screen is in a lighted state, or an application program (APP) in the mobile phone is in a running state, or the user and the mobile phone are in an interactive state.

Whether the use status of the mobile phone is a state of being used by a user or a state of not being used by a user may be determined by using the input unit 201 and the processor unit 202 in FIG. 2.

In some implementations, the state of being used by a user may further include a state of being used by an owner and a state of being used by a non-owner. In a narrow sense, the state of being used by an owner means that a user who uses the mobile phone currently is the owner of the mobile phone, and the state of being used by a non-owner means that a user who uses the mobile phone currently is a user different from the owner of the mobile phone. Possibly, the mobile phone cannot accurately distinguish between the state of being used by an owner and the state of being used by a non-owner, but may use one or more of the following manners to distinguish between the state of not being used by an owner and the state of not being used by a non-owner: determining, according to a running mode of the mobile phone, whether the use status of the mobile phone is the state of not being used by an owner or the state of not being used by a non-owner; or obtaining, by the mobile phone, a feature parameter of a current user, and determining, according to the feature parameter, whether the use status of the mobile phone is the state of not being used by an owner or the state of not being used by a non-owner; or determining, according to a state that is of a hardware or software switch and that is set on the mobile phone, whether the use status of the mobile phone is the state of not being used by an owner or the state of not being used by a non-owner.

For example, when the mobile phone runs in an administrator mode, it is determined that the use status of the mobile phone is the state of not being used by an owner; when the mobile phone runs in a non-administrator mode, it is determined that the use status of the mobile phone is the state of not being used by a non-owner. The use status of the mobile phone may be determined by the processor unit 202 in FIG. 2 according to a running mode of the mobile phone.

The mobile phone obtains the feature parameter of the current user, including but not limited to a physiological feature parameter, a password, or the like. The physiological feature parameter includes but is not limited to iris, a facial feature, a fingerprint, a heart rate, blood pressure, or the like. The password includes but is not limited to a digit, a letter, a pattern, or the like. The feature parameter may be entered proactively by the user when the mobile phone is used, or may be obtained proactively by the mobile phone when the user uses the mobile phone. When the feature parameter of the current user matches a specified parameter corresponding to the state of not being used by an owner, it is determined that the use status of the mobile phone is the state of not being used by an owner; when the feature parameter of the current user matches a specified parameter corresponding to the state of not being used by a non-owner, or the feature parameter of the current user does not match a specified parameter corresponding to the state of not being used by an owner, it is determined that the use status of the mobile phone is the state of not being used by a non-owner.

During implementation, the password may be obtained by the input unit 201 in FIG. 2, for example, a touch panel. The feature parameter may also be obtained by the input unit 201 in FIG. 2, for example, any sensor including but not limited to a camera, an infrared sensor, an ultrasonic sensor, or the like. The use status of the mobile phone may be determined according to the obtained feature parameter by the processor unit 202 in FIG. 2.

Step 505. The wearable device monitors a use status of the wearable device.

Step 505 may include: obtaining usage data of the wearable device, where the usage data of the wearable device includes at least one of: data about one or more sensors, touchscreen use status data, or communications interface traffic data of the wearable device; and determining, according to the obtained usage data, that the use status of the wearable device is a state of being used by a user or a state of not being used by a user.

The sensor includes but is not limited to a cap sensor (may be configured to detect whether, for example, a watch is worn), a motion sensor, a GPS, a light sensor, a camera, a pressure sensor, a Hall effect sensor, a photoelectric sensor, a resistance sensor, a temperature sensor, a biosensor, or the like. The motion sensor may include but is not limited to an accelerometer, a gyroscope, a magnetometer, an altimeter, or the like. The biosensor includes but is not limited to an electrocardio sensor (for example, a PPG sensor or an ECG sensor), a blood pressure sensor, or the like.

For the wearable device, the state of being used by a user means that the wearable device is around the user, including a case of being worn by a user (regardless of whether the user performs an operation on the wearable device). The state of not being used by a user means that the wearable device is not around the user, for example, the wearable device is not being worn by a user. Wearing means that the wearable device is directly or indirectly worn by the user on a body part such as the head, a hand, or the chest. For example, a smartwatch is worn by the user on a wrist, smartglasses are worn by the user on the head, a smart ring is worn by the user on a finger, and a smart breastpin is worn by the user on the chest (may be attached to a clothing and indirectly worn on the chest).

Whether the use status of the wearable device is a state of being used by a user or a state of not being used by a user may be determined by the input unit 201 and the processor unit 202 in FIG. 2.

Further, for the wearable device, the state of being used by a user may also include a state of being used by an owner and a state of being used by a non-owner. That is, in some implementations, the use status of the wearable device may include the state of being worn by an owner, the state of being worn by a non-owner, and a state of not being worn. In some other implementations, the use status of the wearable device may include a state of being worn and a state of not being worn.

Further, in a narrow sense, the state of being worn by an owner means that a user who wears the wearable device currently is the owner of the wearable device, and the state of being worn by a non-owner means that a user who wears the wearable device currently is a user different from the owner of the wearable device. The wearable device may use one or more of the following manners to distinguish between the state of being worn by an owner and the state of being worn by a non-owner: obtaining a biological feature parameter of a user who wears the wearable device currently, and determining, according to the feature parameter, whether the use status of the wearable device is the state of being worn by an owner or the state of being worn by a non-owner; or determining, according to a state that is of a hardware or software switch and that is set on the wearable device, whether the use status of the wearable device is the state of being worn by an owner or the state of being worn by a non-owner.

The obtained biological feature parameter of the user who wears the wearable device currently includes but is not limited to iris, a facial feature, a fingerprint, a heart rate, blood pressure, or the like. For example, smartglasses may scan the iris of the current user, and a smart band may obtain the heart rate, the blood pressure, or the like of the current user.

A biological feature parameter of a user who wears the wearable device currently may be obtained by one or more types of sensors. The sensor includes but is not limited to photoelectric sensor, a resistance sensor, a temperature sensor, a biological feature detection sensor, a camera, or the like. The biological feature detection sensor includes but is not limited to an electrocardio sensor (for example, a PPG sensor or an ECG sensor), a blood pressure sensor, or the like.

Step 506. The wearable device sends a notification message used to describe the use status of the wearable device to the mobile phone.

The wearable device sends the monitored use status of the wearable device to the mobile phone in real time by using the notification message. For example, a use status of the wearable device is determined periodically at a specified time interval, and the determined use status is sent to the mobile phone in real time by using the notification message.

In an implementation of this embodiment of the present disclosure, the mobile phone and the wearable device are wirelessly connected by using a nonmobile communications network such as a BLUETOOTH technology or a WIFI technology, and the wearable device sends the notification message to the mobile phone by using the nonmobile communications network. In this manner, mobile communications network load can be reduced.

In another implementation of this embodiment of the present disclosure, the wearable device may alternatively send the notification message to the mobile phone by using a mobile communications network.

In this embodiment, the wearable device determines the use status of the wearable device according to the usage data of the wearable device, and then notifies the mobile phone of the use status of the wearable device by using the notification message. This can reduce processing load of the mobile phone, and decrease a volume of data transmitted by using a network. Certainly, alternatively, in another embodiment, the wearable device may directly add the usage data of the wearable device to the notification message, and the mobile phone determines the use status of the wearable device according to the usage data of the wearable device.

Step 507. The mobile phone determines either the mobile phone or the wearable device as a communication event receiving terminal according to the use status of the mobile phone and the use status of the wearable device.

The mobile phone receives the notification message sent by the wearable device, obtains a use status of a second terminal according to the notification message, and then determines either the mobile phone or the wearable device as the communication event receiving terminal according to the use status of the mobile phone and the use status of the wearable device.

After determining the communication event receiving terminal, the mobile phone may save an identity of the currently determined communication event receiving terminal. An identity of the mobile phone may be a communication number of the mobile phone, or may be a model or a MAC address of the mobile phone. An identity of the wearable device may be a communication number of the wearable device, or may be a model or a MAC address of the wearable device. In this embodiment, the communication numbers may be directly used as the identities of the mobile phone and the wearable device.

Step 507 may include: when the use status of the mobile phone is a state of being used by a user, determining, by the mobile phone, that a communication event alert terminal is the mobile phone; or when the use status of the wearable device is a state of being used by a user, determining, by the mobile phone, that a communication event alert terminal is the wearable device; or when both the use status of the mobile phone and the use status of the wearable device are a state of being used by a user, determining, by the mobile phone, either the mobile phone or the wearable device as the communication event receiving terminal according to identity information of a current user of the mobile phone and identity information of a current user of the wearable device.

Further, the determining, by the mobile phone, either the mobile phone or the wearable device as the communication event receiving terminal according to identity information of a current user of the mobile phone and identity information of a current user of the wearable device includes: selecting, by the mobile phone, a terminal whose current-user identity information is the same as preset user identity information, as the communication event receiving terminal (for example, the terminal whose current-user identity information is an owner is selected as the communication event receiving terminal); or when both the identity information of the current user of the mobile phone and the identity information of the current user of the wearable device are the same as preset user identity information (for example, if both the identity information of the current user of the mobile phone and the identity information of the current user of the wearable device are owners), using, by the mobile phone, the mobile phone as the communication event receiving terminal; or when both the identity information of the current user of the mobile phone and the identity information of the current user of the wearable device are the same as preset user identity information, determining, by the mobile phone, the communication event receiving terminal according to scenario information of the mobile phone.

One or more of the foregoing specific manners of determining the communication event receiving terminal may be combined to obtain, for example, the following several specific implementations.

In a first implementation, the use status of the mobile phone may include a state of being used by an owner, a state of being used by a non-owner, and a state of not being used by a user, and the use status of the wearable device includes a state of being worn by an owner (that is, not being used by an owner), a state of being worn by a non-owner (that is, not being used by a non-owner), and a state of not being worn (that is, not being used by a user).

In this case, step 507 may include: when the use status of the mobile phone is the state of being used by an owner, determining that the communication event receiving terminal is the mobile phone; when the use status of the mobile phone is the state of being used by a non-owner or the state of not being used by a user and the use status of the wearable device is the state of being worn by an owner, determining that the communication event receiving terminal is the wearable device; or when the use status of the mobile phone is the state of being used by a non-owner or the state of not being used by a user and the use status of the wearable device is the state of being used by a non-owner or the state of not being used by a user, determining that the communication event receiving terminal is the mobile phone.

In a second implementation, the use status of the mobile phone may include a state of being used by an owner, a state of being used by a non-owner, and a state of not being used by a user, and the use status of the wearable device includes a state of being worn (that is, being used by a user) and a state of not being worn (that is, not being used by a user).

In this case, step 507 may include: when the use status of the mobile phone is the state of being used by an owner, determining that the communication event receiving terminal is the mobile phone; when the use status of the mobile phone is the state of being used by a non-owner or the state of not being used by a user and the use status of the wearable device is the state of being worn, determining that the communication event receiving terminal is the wearable device; or when the use status of the mobile phone is the state of being used by a non-owner or the state of not being used by a user and the use status of the wearable device is the state of not being worn, determining that the communication event receiving terminal is the mobile phone.

In a third implementation of this embodiment of the present disclosure, the use status of the mobile phone may include a state of being used by a user and a state of not being used by a user, and the use status of the wearable device includes a state of being worn by an owner, a state of being worn by a non-owner, and a state of not being worn.

In this case, step 507 may include: when the use status of the mobile phone is the state of being used by a user, determining that the communication event receiving terminal is the mobile phone; when the use status of the mobile phone is the state of not being used by a user and the use status of the wearable device is the state of being worn by an owner, determining that the communication event receiving terminal is the wearable device; or when the use status of the mobile phone is the state of not being used by a user and the use status of the wearable device is the state of being worn by a non-owner or the state of not being worn, determining that the communication event receiving terminal is the mobile phone.

In a fourth implementation of this embodiment of the present disclosure, the use status of the mobile phone may include a state of being used by a user and a state of not being used by a user, and the use status of the wearable device includes a state of being worn and a state of not being worn.

In this case, step 507 may include: when the use status of the mobile phone is the state of being used by a user, determining that the communication event receiving terminal is the mobile phone; when the use status of the mobile phone is the state of not being used by a user and the use status of the wearable device is the state of being worn, determining that the communication event receiving terminal is the wearable device; or when the use status of the mobile phone is the state of not being used by a user and the use status of the wearable device is the state of not being worn, determining that the communication event receiving terminal is the mobile phone.

In a fifth implementation of this embodiment of the present disclosure, the use status of the mobile phone may include a state of being used by an owner, a state of being used by a non-owner, and a state of not being used by a user, and the use status of the wearable device includes a state of being worn by an owner, a state of being worn by a non-owner, and a state of not being worn.

In this case, step 507 may include: when the use status of the mobile phone is the state of being used by an owner, determining that the communication event receiving terminal is the mobile phone; when the use status of the mobile phone is the state of being used by a non-owner or the state of not being used by a user and the use status of the wearable device is the state of being worn by an owner, determining that the communication event receiving terminal is the wearable device; when the use status of the mobile phone is the state of being used by a non-owner and the use status of the wearable device is the state of being worn by a non-owner, determining that there is no communication event receiving terminal; when the use status of the mobile phone is the state of not being used by a non-owner and the use status of the wearable device is the state of not being worn, determining that the communication event receiving terminal is the wearable device; or when the use status of the mobile phone is the state of not being used by a user and the use status of the wearable device is the state of not being worn or the state of being worn by a non-owner, determining that the communication event receiving terminal is the mobile phone.

In the fifth implementation, when the terminal is not used by the owner, the communication event receiving terminal is not determined as the terminal. This can keep a communication event from being glanced by another person, thereby protecting privacy of a terminal owner.

In a sixth implementation, step 507 may include: determining, according to at least one of the use status of the mobile phone or the use status of the wearable device, communication event receiving capability information, where the communication event receiving capability information includes at least one of the following: whether the communication number of the mobile phone can receive a communication event, or whether the communication number of the wearable device can receive a communication event; and determining a receiving device identity according to the communication event receiving capability information.

Further, the determining, according to at least one of the use status of the mobile phone or the use status of the wearable device, communication event receiving capability information may include: determining, according to the use status of the mobile phone, whether the communication number of the mobile phone can receive a communication event; or determining, according to the use status of the wearable device, whether the communication number of the wearable device can receive a communication event; or determining, according to the use status of the mobile phone and the use status of the wearable device, whether the communication number of the mobile phone can receive a communication event or whether the wearable device can receive a communication event.

The determining, according to the use status of the mobile phone, whether the communication number of the mobile phone can receive a communication event may include: when the use status of the mobile phone is a state of being used by an owner or a state of being used, determining that the communication number of the mobile phone can receive a communication event; or when the use status of the mobile phone is a state of being used by a non-owner or a state of not being used by a user, determining that the communication number of the mobile phone cannot receive a communication event.

The determining, according to the use status of the wearable device, whether the wearable device can receive a communication event includes: when the use status of the wearable device is a state of being worn by an owner or a state of being worn, determining that the wearable device can receive a communication event; or when the use status of the wearable device is a state of being worn by a non-owner or a state of not being worn, determining that the wearable device cannot receive a communication event.

Further, the determining a communication event receiving terminal according to the communication event receiving capability information may include: when the communication number of the mobile phone can receive a communication event, determining that the communication event receiving terminal is the mobile phone; when the communication number of the mobile phone cannot receive a communication event and the communication number of the wearable device can receive a communication event, determining that the communication event receiving terminal is the wearable device; or when the communication number of the wearable device can receive a communication event and the communication number of the mobile phone cannot receive a communication event, determining that the communication event receiving terminal is the wearable device.

Step 508. The mobile phone determines, by means of comparison, whether the currently determined communications device receiving terminal is the same as a communications device receiving terminal determined last time; and if the currently determined communications device receiving terminal is different from the communications device receiving terminal determined last time, step 509 is performed, or if the currently determined communications device receiving terminal is the same as the communications device receiving terminal determined last time, step 504 to step 508 are performed.

An identity of the communication event receiving terminal determined last time is stored in the mobile phone. After the communication event receiving terminal is determined currently, the identity of the communication event receiving terminal determined last time is compared with that of the communication event receiving terminal currently determined to determine whether the communication event receiving terminal changes. When the communication event receiving terminal changes, step 509 is performed, or when the communication event receiving terminal keeps unchanged, determining the communication event receiving terminal according to the use status of the mobile phone and the use status of the wearable device continues.

It should be noted that step 508 is an optional step, or step 509 may be directly performed according to the currently determined communication event receiving terminal and the communication event receiving terminal determined last time.

Step 509. When the currently determined communication event receiving terminal is the wearable device, and the communication event receiving terminal determined last time is the mobile phone, the mobile phone sends a communication event transfer start instruction message to a server; when the currently determined communication event receiving terminal is the mobile phone, and the communication event receiving terminal determined last time is the wearable device, the mobile phone sends a communication event transfer stop instruction message to the server.

The communication event transfer start instruction message is used to instruct the server to forward, to the wearable device, a received communication event to be sent to the mobile phone. The communication event transfer stop instruction message is used to instruct the server to stop forwarding, to the wearable device, a communication event to be sent to the mobile phone, that is, to instruct the server to send, to the mobile phone, the communication event to be sent to the mobile phone.

The server stores the communication number of the mobile phone and the communication number of the wearable device. The instructing the server to forward, to the wearable device, the received communication event to be sent to the mobile phone includes instructing the server to forward, to the communication number of the wearable device, the received communication event to be sent to the communication number of the mobile phone.

It should be noted that names of the communication event transfer start instruction message and the communication event transfer stop instruction message are used only to distinguish messages, but is not construed as limitation. During implementation, another name may alternatively be used, for example, the communication event transfer start instruction message may be referred to as a service transfer request message, and the communication event transfer stop instruction message may be referred to as a service transfer canceling request message.

In an implementation, the communication event transfer start instruction message may be a service transfer request. The service transfer request may carry a target communication number (that is, the communication number of the wearable device), or may carry a target communication number (that is, the communication number of the wearable device) and a source communication number (the communication number of the mobile phone), or may carry no communication number.

The communication event transfer stop instruction message may carry no communication number, and the server determines a communication number of a sender according to the sender of the communication event transfer stop instruction message, so as to determine to turn off service transfer for the communication number of the sender. After the service transfer is turned off, if receiving a message to be sent to the communication number of the sender, the server directly sends the message to the communication number of the sender.

The communication event transfer stop instruction message may alternatively include a source communication number (that is, the communication number of the wearable device) and a target communication number (that is, the communication number of the mobile phone). The communication event transfer stop instruction message is used to instruct the server to send, to the target communication number, the communication event to be sent to the target communication number.

It should be noted that if the server does not correspondingly save the communication number of the mobile phone or the communication number of the wearable device, the communication event transfer start instruction message needs to carry a target communication number, so that the server can obtain, from the communication event transfer start instruction message, the target communication number corresponding to the communication number of the mobile phone.

In another implementation, the communication event transfer start instruction message may be a state update request, where the state update request carries a communication number and a state identifier, and the state identifier is used to indicate whether the communication number receives a service currently. For example, the state update request may be StatusUpdateMessage (the communication number of the mobile phone, N). In this case, the state update request indicates that the communication number of the mobile phone does not receive a service currently. The server transfers, to the communication number of the wearable device corresponding to the communication number of the mobile phone, a message to be sent to the communication number of the mobile phone.

The communication event transfer stop instruction message may alternatively be a state update request, for example, the state update request may be StatusUpdateMessage (the communication number of the mobile phone, Y). In this case, the state update request indicates that the communication number of the mobile phone receives a service currently. The server directly sends, to the communication number of the mobile phone, a message to be sent to the communication number of the mobile phone.

The state identifiers Y and N are merely examples, or another state identifier may be used, for example, 1 indicates reception, and 0 indicates no reception.

In still another implementation, both the communication event transfer start instruction message and the communication event transfer stop instruction message may be number update requests. The number update request carries a source communication number and a target communication number, and is used to instruct to send a message of the source communication number to the target communication number. For example, the source communication number in the communication event transfer start instruction message is the communication number of the mobile phone, and the target communication number in the communication event transfer start instruction message is the communication number of the wearable device. The source communication number in the communication event transfer stop instruction message is the communication number of the mobile phone, and the target communication number is also the communication number of the mobile phone.

Optionally, the method may further include: when it is determined that there is no communication event receiving terminal, sending, by the mobile phone, a communication event sending stop instruction message to the server, where the communication event sending stop instruction message is used to instruct the server to save, onto the server, a communication event to be sent to the mobile phone.

Step 510. The server receives the communication event transfer start instruction message or the communication event transfer stop instruction message and records a communication number of the communication event receiving terminal.

Optionally, after the server receives the communication event sending stop instruction message, a state identifier may be set. The state identifier is used to instruct the server to save, onto the server, a communication event with a target number being the communication number of the mobile phone.

Step 511. The server receives a communication event with a target number being the communication number of the mobile phone.

Step 512. Send, to the communication number of the communication event receiving terminal according to the recorded communication number of the communication event receiving terminal, the communication event with the target number being the communication number of the mobile phone.

Optionally, step 512 may further include: when the communication number of the communication event receiving terminal is empty (for example, the foregoing state identifier has been set), saving, onto the server, the communication event with the target number being the communication number of the mobile phone, where the communication event with the target number being the communication number of the mobile phone is saved onto the server, so as to keep the communication event from being glanced by another person, thereby protecting user privacy.

Further, step 512 may further include: when the communication event transfer start instruction message or the communication event transfer stop instruction message is received (indicating that at least one of the mobile phone or the wearable device can receive a communication event), sending, to the communication number of the mobile phone or the communication number of the wearable device, the communication event that is with the target number being the communication number of the mobile phone and that is saved onto the server.

It should be noted that in this embodiment, the communication event with the target number being the communication number of the mobile phone is transferred between the mobile phone and the wearable device. In another embodiment, a communication event with the target number being the communication number of the wearable device is transferred between the mobile phone and the wearable device provided that actions performed by the mobile phone and the wearable device in the foregoing steps are exchanged.

Optionally, the method in this embodiment may further include: determining, by the mobile phone, scenario information of the mobile phone; and determining, by the mobile phone according to the use status of the mobile phone, the use status of the wearable terminal, and the scenario information, whether to forward a received communication event to the wearable device.

A scenario includes but is not limited to a motion scenario, an in-vehicle scenario, a sleep scenario, or the like.

For example, in the motion scenario or the in-vehicle scenario, when the use status of the mobile phone is the state of being used by an owner and the use status of the wearable terminal is also the state of being used by an owner, after the mobile phone, as a receiving device, receives a communication event, the mobile phone does not display the received communication event, but sends the communication event to the wearable device, and the wearable device alerts the user to the received communication event. The mobile phone performs, with reference to a scenario of the user, secondary determining on a terminal device that displays a communication event, so as to better meet a user's requirement.

Optionally, after receiving a communication event, the mobile phone sends the communication event to the wearable device by using a nonmobile communications network such as a BLUETOOTH connection or a WIFI connection. Correspondingly, the method in this embodiment further includes: detecting, by the mobile phone, whether there is a connection established between the mobile phone and the wearable device by using the nonmobile communications network, and if there is a connection established by using the nonmobile communications network, sending the communication event to the wearable device by using the nonmobile communications network. The mobile phone sends a message to the wearable device by using the nonmobile communications network, so as to reduce mobile communications network load.

Figure 6:
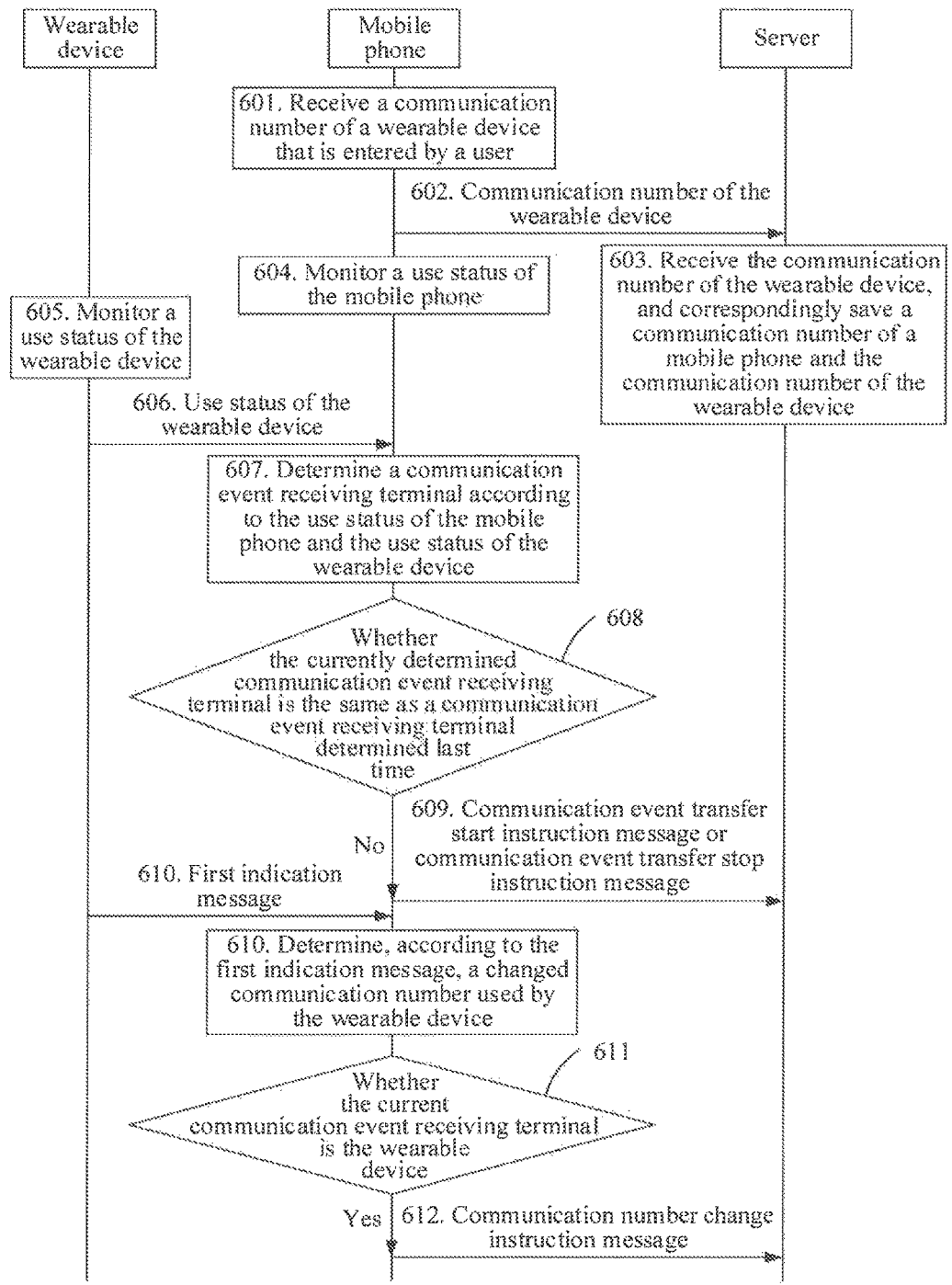
FIG. 6 is a flowchart of a communication event transfer method according to still another embodiment of the present disclosure.

FIG. 6 is a flowchart of a communication event transfer method according to another embodiment of the present disclosure. In this embodiment, the communication event transfer method in this embodiment of the present disclosure is detailed by using an example in which a mobile phone (a first terminal) determines a communication event receiving terminal. A difference from the embodiment shown in FIG. 5 lies in that, in this embodiment, multiple communication numbers are configured for a wearable device. A different operator provides a mobile communications network service for each communication number. In addition, the wearable device uses only one communication number at a time (corresponding to the second situation). As shown in FIG. 6, the method includes the following steps.

Step 601. The mobile phone receives a communication number of the wearable device that is entered by a user.

Step 602. The mobile phone sends the received communication number of the wearable device to a server.

Step 603. The server receives the communication number of the wearable device, and correspondingly saves a communication number of the mobile phone and the communication number of the wearable device.

Optionally, the server may correspondingly save the communication number of the mobile phone and the communication number of the wearable device in a manner of an array, for example, <the communication number of the mobile phone, a communication number 1 of the wearable device, a communication number 2 of the wearable device, . . . >, or may save a communication number of a corresponding mobile phone and a communication number of a wearable device in a form of a relationship table.

Step 604. The mobile phone monitors a use status of the mobile phone.

Step 605. The wearable device monitors a use status of the wearable device.

Step 606. The wearable device sends the monitored use status of the wearable device to the mobile phone.

Step 607. The mobile phone receives the use status of the wearable device that is sent by the wearable device, and determines a communication event receiving terminal according to the use status of the mobile phone and the use status of the wearable device.

Step 608. The mobile phone determines, by means of comparison, whether the currently determined communication event receiving terminal is the same as a communication event receiving terminal determined last time; and if the currently determined communication event receiving terminal is different from the communication event receiving terminal determined last time, step 609 is performed, or if the currently determined communication event receiving terminal is the same as a communication event receiving terminal determined last time, step 604 to step 606 are performed.

For a specific implementation of step 604 to step 608, refer to step 504 to step 508, and detailed descriptions are omitted herein.

Step 609. When the currently determined communication event receiving terminal is the wearable device, and the communication event receiving terminal determined last time is the mobile phone, the mobile phone sends a communication event transfer start instruction message to a server; when the currently determined communication event receiving terminal is the mobile phone, and the communication event receiving terminal determined last time is the wearable device, the mobile phone sends a communication event transfer stop instruction message to the server.

The communication event transfer start instruction message is used to instruct the server to forward, to the wearable device, a received communication event to be sent to the mobile phone. The communication event transfer stop instruction message is used to instruct the server to stop forwarding, to the wearable device, a communication event to be sent to the mobile phone, that is, to instruct the server to send, to the mobile phone, the communication event to be sent to the mobile phone.

For specific implementation of the communication event transfer start instruction message and the communication event transfer stop instruction message, refer to step 509, and detailed descriptions are omitted herein.

For a processing manner used after the server receives the communication event transfer start instruction message and the communication event transfer stop instruction message, refer to step 510 to step 512, and detailed descriptions are omitted herein.

Step 610. When receiving a first indication message sent by the wearable device, the mobile phone determines, according to the first indication message, a changed communication number used by the wearable device, where the first indication message is used to indicate that the communication number used by the wearable device changes.

The first indication message may carry a changed operator network identifier, or may include the changed communication number.

When the first indication message carries a changed operator network identifier, the mobile phone needs to determine, according to a correspondence between a preset operator network identifier and the communication number of the wearable device, a communication number, of the wearable device, corresponding to the changed operator network identifier; or the mobile phone needs to determine, by using a network server, a communication number, of the wearable device, corresponding to the changed operator network identifier, that is, the changed communication number used by the wearable device.

Step 611. The mobile phone determines whether the current communication event receiving terminal is the wearable device; and if the communication event receiving terminal is the wearable device, step 612 is performed, or if the communication event receiving terminal is not the wearable device, step 604 to step 609 are performed.

When the current communication event receiving terminal is the wearable device, it indicates that the mobile phone sends the communication event transfer start instruction message to the server. Currently, the server forwards, to the wearable device, a communication event to be sent to the mobile phone.

Step 612. The mobile phone sends a communication number change instruction message to the server.

The communication number change instruction message is used to instruct the server to send, to the changed communication number used by the wearable device, a message with a target number being the communication number of the mobile phone, that is, to send, to the wearable device by using a communication number currently used by the wearable device, a communication event to be sent to the mobile phone.

The communication number change instruction message may be a service transfer request. The service transfer request may carry a target communication number (that is, the changed communication number used by the wearable device), or may carry a target communication number (that is, the changed communication number used by the wearable device) and a source communication number (that is, the communication number of the mobile phone).

Figure 7:
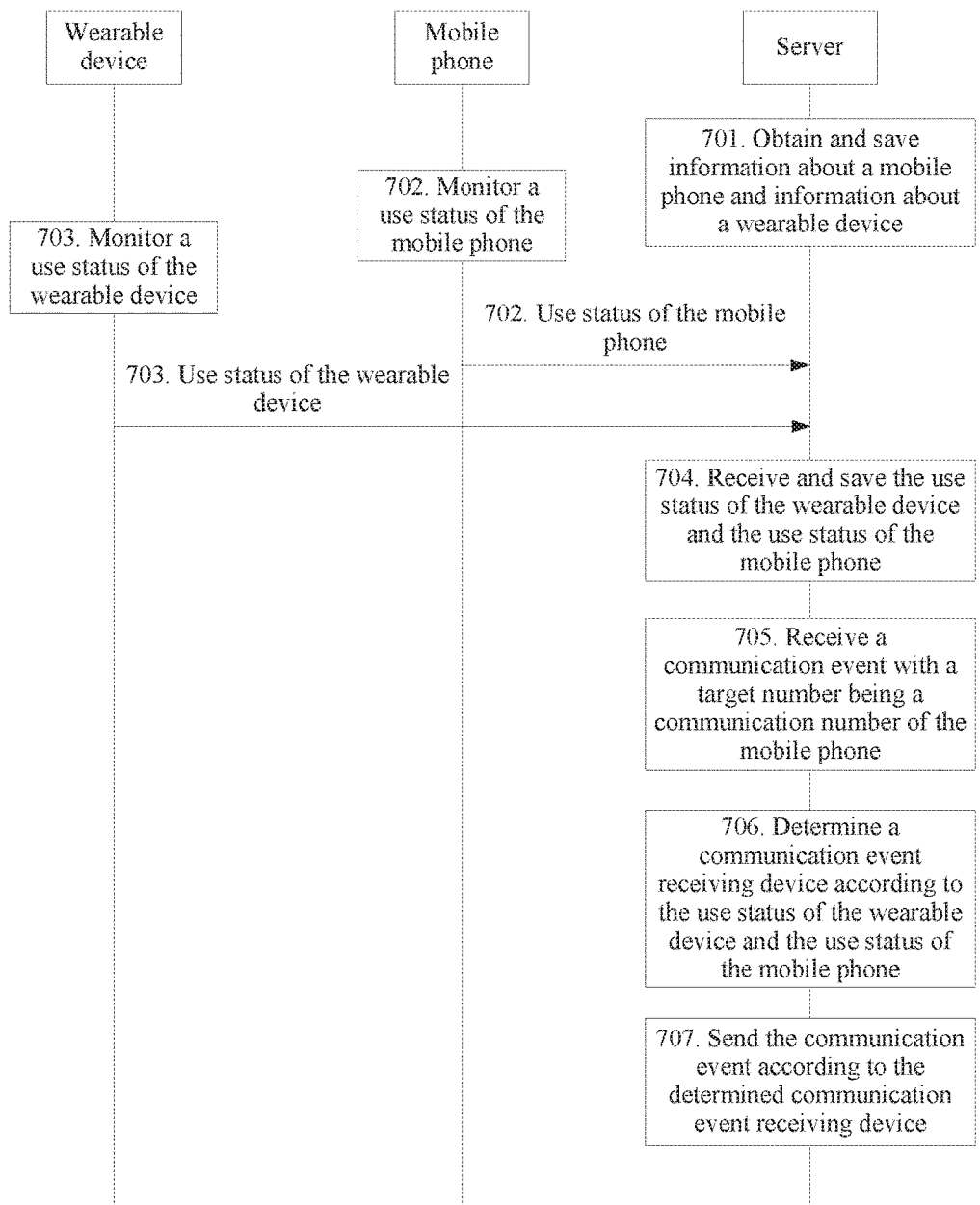
FIG. 7 is a flowchart of a communication event transfer method according to still another embodiment of the present disclosure.

FIG. 7 is a flowchart of a communication event transfer method according to still another embodiment of the present disclosure. In this embodiment, the communication event transfer method in this embodiment of the present disclosure is detailed by using an example in which a server determines a communication event receiving terminal according to a use status of a first terminal and a use status of a second terminal. As shown in FIG. 7, the method includes the following steps.

Step 701. The server obtains and saves information about a mobile phone and information about a wearable device.

The information about the mobile phone includes device information of the mobile phone and a communication number of the mobile phone. The information about the wearable device includes device information of the wearable device and a communication number of the wearable device.

Step 701 is used to subscribe to a service transfer function for the communication number of the mobile phone. In this embodiment, after subscription of the service transfer function, the server determines a target communication number, that is, a communication number that receives a communication event, according to a use status of the mobile phone and a use status of the wearable device when receiving a message to be sent to the communication number of the mobile phone.

During implementation, information about the mobile phone and information about a wearable device may be saved in a form of a number status table, for example, a form shown in Table 1.

TABLE 1

| Primary number | Primary number bound device | Primary number bound device status | Secondary number | Secondary number bound device | Secondary number bound device status |
|---|---|---|---|---|---|
| 18812345678 | HW-P8 | Being used (by an owner) | 13011112222 | HW-Watch | Being worn by an owner |

Step 701 is an optional step.

Step 702. The mobile phone monitors a use status of the mobile phone and sends the monitored use status of the mobile phone to the server.

During implementation, the mobile phone may send a current use status of the mobile phone to the server when learning, by means of monitoring, that the use status of the mobile phone changes, so as to reduce a communication volume.

For classification of the use status of the mobile phone, refer to step 504, and detailed descriptions are omitted herein.

Step 703. The wearable device monitors a use status of the wearable device and sends the monitored use status of the wearable device to the server.

During implementation, the wearable device may send a current use status of the wearable device to the server when learning, by means of monitoring, that the use status of the wearable device changes, so as to reduce a communication volume.

For classification of the use status of the wearable device, refer to step 605, and detailed descriptions are omitted herein.

Step 704. The server receives and saves the use status of the wearable device that is sent by the wearable device and the use status of the mobile phone that is sent by the mobile phone.

During implementation, the use status of the wearable device and the use status of the mobile phone may be saved in a form of a list.

Step 705. The server receives a communication event to be sent to the communication number of the mobile phone.

Step 706. Determine, according to the use status of the mobile phone and the use status of the wearable device, a target communication number (that is, a communication number of a communication event receiving terminal).

For a specific manner of determining, according to the use status of the mobile phone and the use status of the wearable device, the target communication number, refer to step 507, and detailed descriptions are omitted herein.

Step 707. Send the communication event according to the determined communication number of the communication event receiving terminal.

Step 707 includes: sending, to the communication number of the communication event receiving terminal, a communication event with a target number being the communication number of the mobile phone.

It should be noted that in this embodiment, when receiving the communication event to be sent to the mobile phone, the server determines the target communication number according to the use status of the mobile phone and the use status of the wearable device. This can reduce power consumption of the server. In another embodiment, alternatively, the server may determine the target communication number each time when receiving the use status of the mobile phone that is sent by the mobile phone or the use status of the wearable device that is sent by the wearable device, and directly send the communication event to the target communication number when receiving the communication event to be sent to the mobile phone. In this way, although power consumption of the server is increased, a communication event sending speed can be increased.

Figure 8:
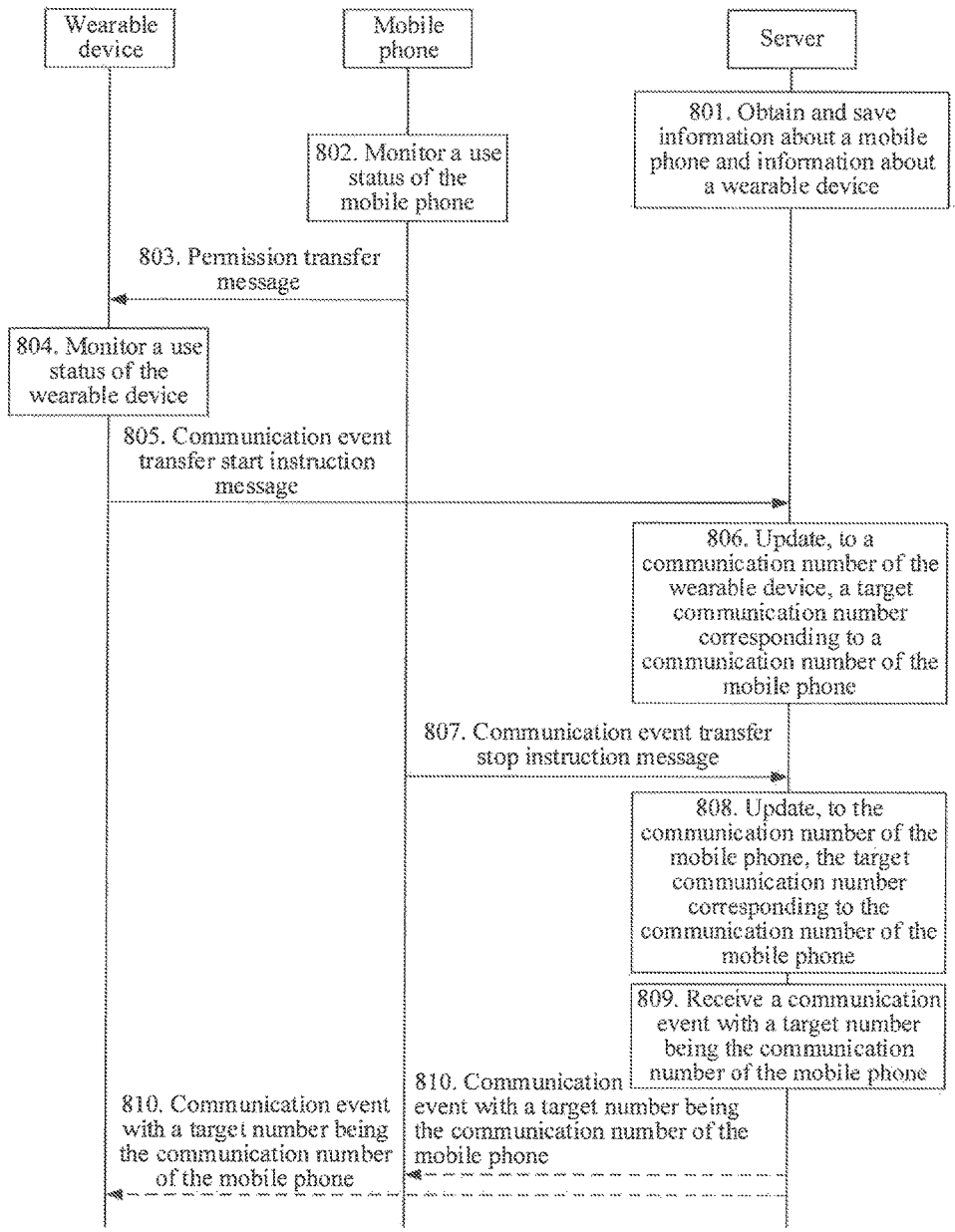
FIG. 8 is a flowchart of a communication event transfer method according to yet another embodiment of the present disclosure.

FIG. 8 is a flowchart of a communication event transfer method according to yet another embodiment of the present disclosure. In this embodiment, a second terminal sends a communication event transfer stop instruction message to a server. A first terminal sends a permission transfer message to the second terminal according to a state change of the first terminal or sends a communication event transfer start instruction message to the server. As shown in FIG. 8, the method includes the following steps.

Step 801. The server obtains and saves information about a mobile phone and information about a wearable device.

In this embodiment, the information about the mobile phone includes a communication number of the mobile phone, and may further include device information of the mobile phone. The information about the wearable device includes a communication number of the wearable device, and may further include device information of the wearable device.

Step 802. The mobile phone monitors a use status of the mobile phone; and when the mobile phone learns, by means of monitoring, the use status of the mobile phone is changed from a first specified state to a second specified state, performs step 803, or when the mobile phone learns, by means of monitoring, the use status of the mobile phone is changed from a second specified state to a first specified state, performs step 807.

For classification of the use status of the mobile phone and a determining manner, refer to step 504, and detailed descriptions are omitted herein.

When the use status of the mobile phone includes a state of being used by an owner, a state of being used by a non-owner, and a state of not being used by a user, the first specified state may be the state of being used by an owner, and the second specified state may be the state of not being used by a user or the state of being used by a non-owner. When the use status of the mobile phone includes a state of being used by a user and a state of not being used by a user, the first specified state may be the state of being used, and the second specified state is the state of not being used by a user. It should be noted that when the use status of the mobile phone is changed from the first specified state to the second specified state or is changed from the second specified state to the first specified state, it may be determined that a communication event receiving terminal changes, based on consideration that a communication event of the mobile phone does not need to be transferred to another terminal when the mobile phone is being used by the owner.

Step 803. The mobile phone sends a permission transfer message to the wearable device.

Step 804. The wearable device monitors a use status of the wearable device.

For classification of the use status of the wearable device, refer to step 505, and detailed descriptions are omitted herein.

Step 805. The wearable device receives the permission transfer message sent by the mobile phone, obtains the use status of the wearable device, and sends a communication event transfer start instruction message to the server when the use status of the wearable device is a third specified state.

The communication event transfer start instruction message is used to instruct the server to forward, to the wearable device, a received communication event to be sent to the mobile phone. During implementation, the communication event transfer start instruction message may be a target number update request, where the target number update request is used to instruct the server to update, to the communication number of the wearable device, a target communication number corresponding to the communication number of the mobile phone, and transfers, to the communication number of the wearable device, a communication event to be sent to the communication number of the mobile phone.

When the use status of the wearable device includes a state of being worn by an owner, a state of being worn by a non-owner, and a state of not being worn. The third specified state is the state of being worn by an owner. When the use status of the wearable device includes a state of being worn and a state of not being worn, the third specified state is the state of being worn.

When a current use status of the wearable device is not the third specified state, no communication event transfer start instruction message is sent to the server. In this case, the target communication number that is corresponding to the communication number of the mobile phone and that is saved onto the server is still the communication number of the mobile phone.

Step 806. The server receives the communication event transfer start instruction message sent by the wearable device, and updates, to the communication number of the wearable device according to the communication event transfer start instruction message, a target communication number corresponding to the communication number of the mobile phone.

Step 807. The mobile phone sends a communication event transfer stop instruction message to the server.

The communication event transfer stop instruction message is used to instruct the server to stop forwarding, to the wearable device, a communication event to be sent to the mobile phone, that is, to instruct the server to send, to the mobile phone, the communication event to be sent to the mobile phone. During implementation, the communication event transfer stop instruction message may be a target number update request. The target number update request is used to instruct the server to update, to the communication number of the mobile phone, the target communication number corresponding to the communication number of the mobile phone, and send, to the communication number of the mobile phone, a message to be sent to the communication number of the mobile phone.

Step 808. The server receives a communication event transfer stop instruction message sent by the mobile phone, and updates, to the communication number of the mobile phone according to the communication event transfer stop instruction message, a target communication number corresponding to the communication number of the mobile phone.

Step 809. The server receives a communication event to be sent to the communication number of the mobile phone.

Step 810. The server sends, to a target communication number currently corresponding to the communication number of the mobile phone, the communication event to be sent to the communication number of the mobile phone.

Figure 9:
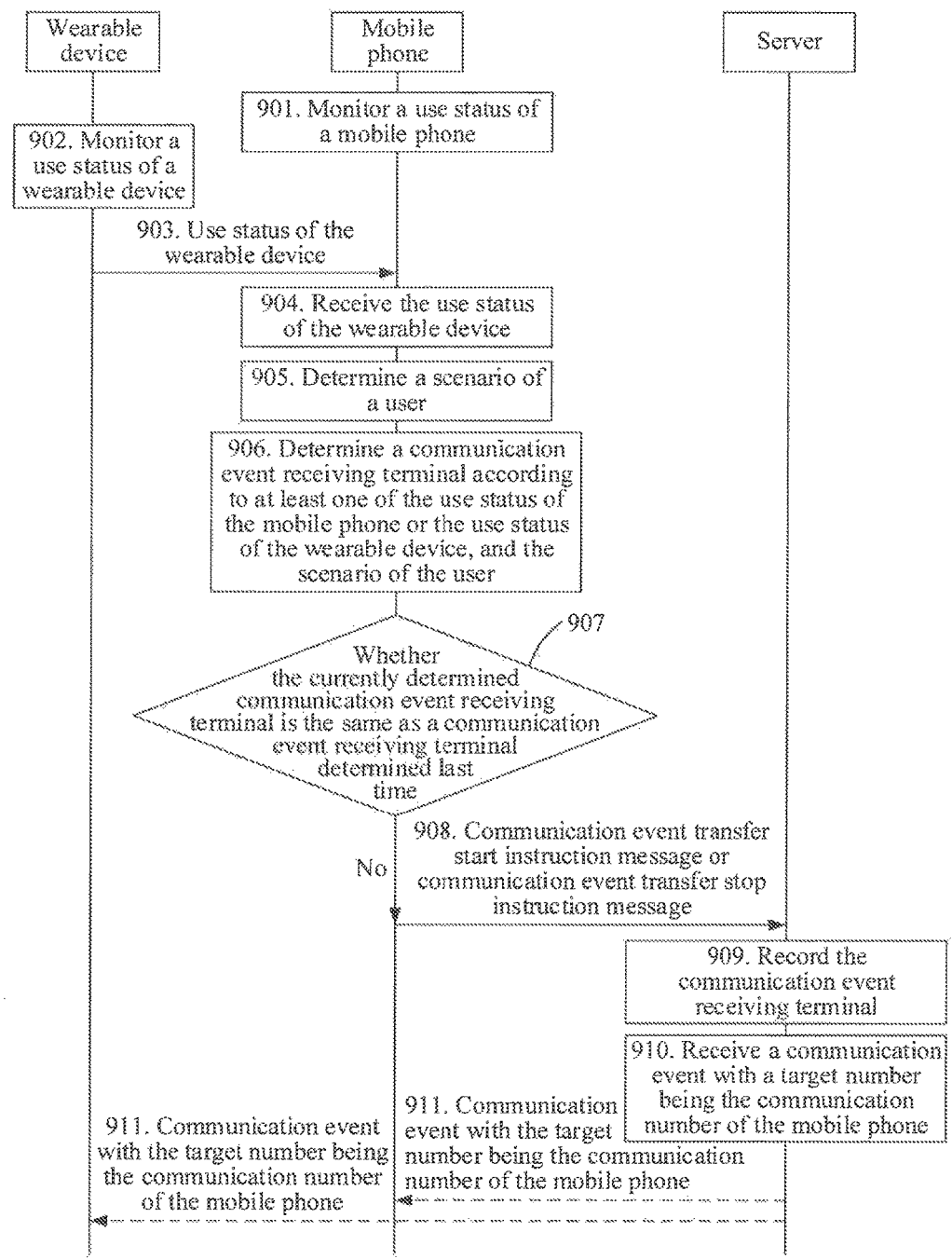
FIG. 9 is a flowchart of a communication event transfer method according to still another embodiment of the present disclosure.

FIG. 9 is a flowchart of a communication event transfer method according to an embodiment of the present disclosure. In this embodiment, the communication event transfer method in this embodiment of the present disclosure is detailed by using an example in which a mobile phone determines a communication event receiving terminal. In this embodiment, when determining the communication event receiving terminal, the mobile phone still needs to obtain scenario information of a current user in addition to considering a use status of the mobile phone and a use status of a wearable device, and determine the communication event receiving terminal with reference to the scenario information of the user. As shown in FIG. 9, the method includes the following steps.

Step 901. The mobile phone monitors the use status of the mobile phone.

Step 902. The wearable device monitors the use status of the wearable device.

Step 903. The wearable device sends the monitored use status of the wearable device to the mobile phone.

Step 904. The mobile phone receives the use status of the wearable device that is sent by the wearable device.

For a specific implementation of step 901 to step 904, refer to step 504 to step 506, and detailed descriptions are omitted herein.

Step 905. The mobile phone determines a scenario of a user.

The scenario includes but is not limited to a motion scenario, an in-vehicle scenario, a sleep scenario, or the like.

Step 905 may include: obtaining the scenario information of the user; and determining the scenario of the user according to the obtained scenario information.

The scenario information may be obtained by using one or more of a motion sensor, a light sensor, a physiological signal sensor, a WIFI signal, or the like, or may be obtained by detecting a scenario mode of the mobile phone, for example, a sleep scenario corresponding to a Do Not Disturb mode or Sleep mode.

For example, the motion scenario and the sleep scenario may be detected by using the motion sensor, and the in-vehicle scenario may be detected by using one or more of in-vehicle WIFI, the motion sensor, or a GPS.

Step 906. The mobile phone determines the communication event receiving terminal according to at least one of the use status of the mobile phone or the use status of the wearable device, and the scenario of the user.

In an implementation, when the scenario of the user is the in-vehicle scenario or the motion scenario, it is inconvenient to operate the mobile phone; the following manner may be used:

When the use status of the mobile phone is a state of being used by an owner and the use status of the wearable device is a state of being used by an owner, it is determined that the communication event receiving terminal is the wearable device. In another use state, a communication event receiving terminal may be determined by using one of the first to the fifth implementations in step 508, and detailed descriptions are omitted herein.

In another implementation, when the scenario of the user is a sleep scenario, it is determined that there is no communication event receiving terminal; or when the scenario of the user is a non-sleep mode, the communication event receiving terminal may be determined by using any one of the first to the fifth implementations in step 508.

Step 907. The mobile phone determines, by means of comparison, whether the currently determined communication event receiving terminal is the same as a communication event receiving terminal determined last time; and if the currently determined communication event receiving terminal is different from the communication event receiving terminal determined last time, step 908 is performed, or if the currently determined communication event receiving terminal is the same as the communication event receiving terminal determined last time, step 901 to step 906 are performed.

Step 908. When the currently determined communication event receiving terminal is the wearable device, and the communication event receiving terminal determined last time is the mobile phone, the mobile phone sends a communication event transfer start instruction message to a server; when the currently determined communication event receiving terminal is the mobile phone, and the communication event receiving terminal determined last time is the wearable device, the mobile phone sends a communication event transfer stop instruction message to a server.

The communication event transfer start instruction message is used to instruct the server to forward, to the wearable device, a received communication event to be sent to the mobile phone. The communication event transfer stop instruction message is used to instruct the server to stop forwarding, to the wearable device, a communication event to be sent to the mobile phone, that is, to instruct the server to send, to the mobile phone, the communication event to be sent to the mobile phone.

For specific implementation of the communication event transfer start instruction message and the communication event transfer stop instruction message, refer to step 509, and detailed descriptions are omitted herein.

Step 909. The server receives the communication event transfer start instruction message or the communication event transfer stop instruction message and records a communication number of the communication event receiving terminal.

Step 910. The server receives a communication event with a target number being the communication number of the mobile phone.

Step 911. The server sends, to the communication number of the communication event receiving terminal according to the recorded communication number of the communication event receiving terminal, the communication event with the target number being the communication number of the mobile phone.

Figure 10:
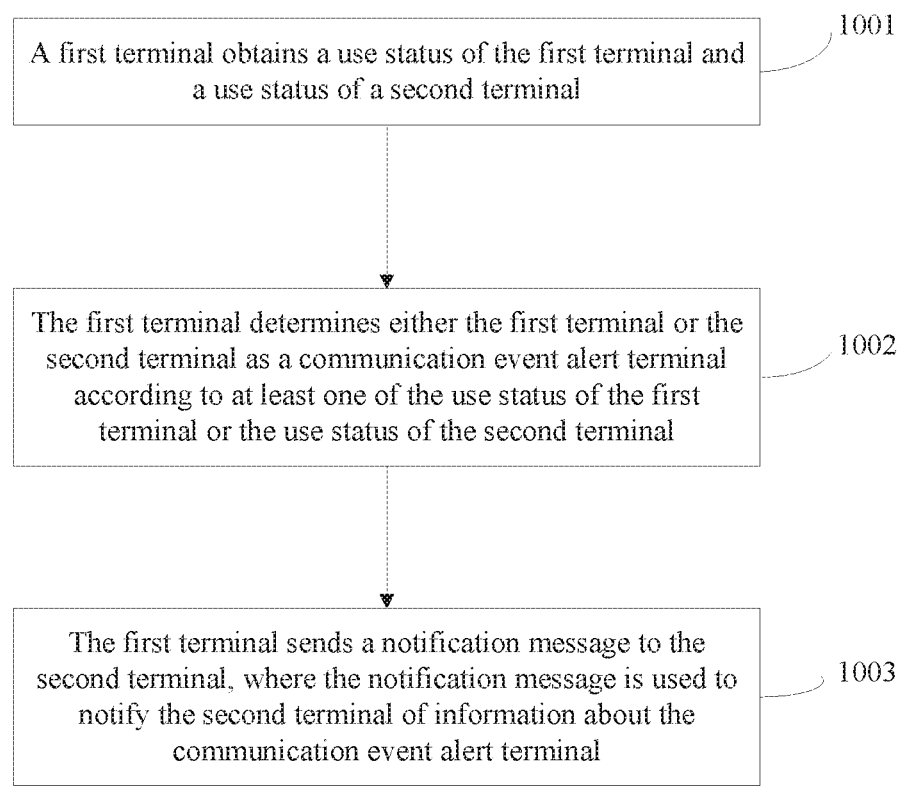
FIG. 10 is a flowchart of a communication event processing method according to an embodiment of the present disclosure.

FIG. 10 shows a communication event processing method according to an embodiment of the present disclosure. Referring to FIG. 10, the method includes:

Step 1001. A first terminal obtains a use status of the first terminal and a use status of a second terminal.

Step 1002. The first terminal determines either the first terminal or the second terminal as a communication event alert terminal according to at least one of the use status of the first terminal or the use status of the second terminal.

The communication event alert terminal is configured to receive a communication event to be sent to the first terminal and/or the second terminal and display the communication event to the user.

Step 1003. The first terminal sends a notification message to the second terminal, where the notification message is used to notify the second terminal of information about the communication event alert terminal.

According to this embodiment of the present disclosure, the first terminal determines the communication event alert terminal according to the use status of the first terminal and the use status of second terminal, and the communication event alert terminal receives the communication event to be sent to the first terminal and/or the second terminal and display the communication event to the user. The use statuses of the two terminals are both considered, so as to increase a probability that the user sees the communication event in a timely manner, and to better meet an actual usage requirement of the user.

Figure 11:
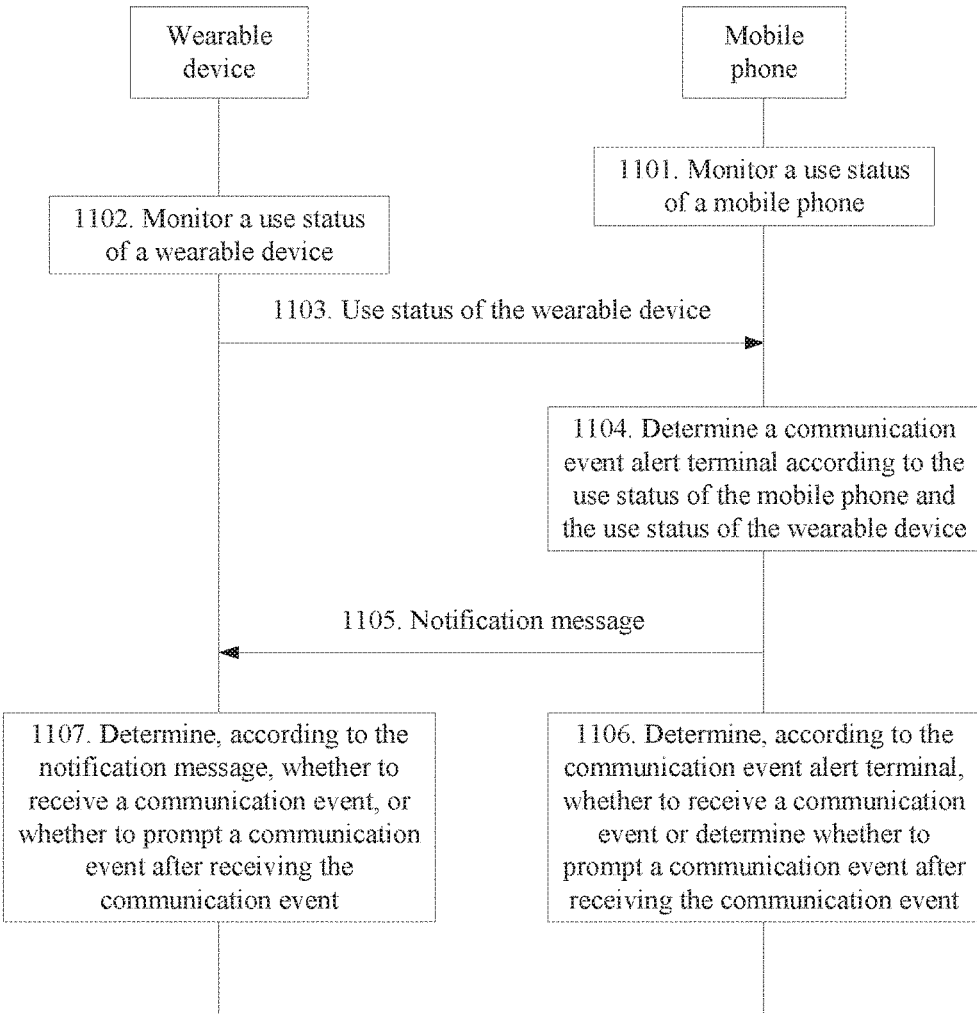
FIG. 11 is a flowchart of a communication event processing method according to another embodiment of the present disclosure.

FIG. 11 shows a communication event processing method according to another embodiment of the present disclosure. In this embodiment, descriptions are provided by using an example in which a first terminal is a mobile phone and a second terminal is a wearable device. Certainly, in another embodiment, a wearable device may be used as a first terminal, and a mobile phone may be used as a second terminal. This is not limited in the present disclosure. Referring to FIG. 11, the method includes the following steps.

Step 1101. The mobile phone monitors a use status of the mobile phone.

For a specific implementation of this step, refer to step 504, and details are not repeated herein.

Step 1102. The wearable device monitors a use status of the wearable device.

For a specific implementation of this step, refer to step 505, and details are not repeated herein.

Step 1103. The wearable device sends, to the mobile phone, a notification message that is used to describe the use status of the wearable device and that is sent by the mobile phone.

The mobile phone receives the notification message sent by the wearable device and obtains the use status of the second terminal according to the notification message.

Step 1104. The mobile phone determines either the mobile phone or the wearable device as a communication event alert terminal according to at least one of the use status of the mobile phone and the use status of the wearable device.

The communication event alert terminal is configured to receive a communication event to be sent to the mobile phone and/or the wearable device and display the communication event to a user.

For a manner of determining the communication event alert terminal, refer to a manner of determining the communication event receiving terminal in the foregoing embodiment, and detailed descriptions are omitted herein.

Step 1105. The mobile phone sends a notification message to the wearable device, where the notification message is used to notify the wearable device of information about the communication event alert terminal.

During implementation, the mobile phone sends the notification message to the wearable device when the determined communication event alert terminal changes.

The method may further include the following steps:

Step 1106. The mobile phone determines, according to the determined communication event alert terminal, whether to receive a communication event or determine whether to prompt a communication event after receiving the communication event.

Step 1106 may include: when the communication event alert terminal is the mobile phone, receiving and prompting, by the mobile phone, the communication event; when the communication event alert terminal is the wearable device, skipping, by the mobile phone, receiving the communication event, or receiving the communication event without a prompt; or when the communication event alert terminal is the wearable device, and the mobile phone determines, according to location information of the mobile phone and location information of the wearable device, that a distance between the mobile phone and the wearable device is less than a specified value, receiving, by both the mobile phone and the wearable device, the communication event and displaying the communication event to the user, where in this case, the user chooses a terminal that is more convenient for the user, to view the communication event, for more convenient use.

Step 1107. The wearable device receives a notification message and determines, according to the notification message, whether to receive a communication event, or whether to prompt a communication event after receiving the communication event.

Step 1107 may include: when the communication event alert terminal is the mobile phone, skipping, by the wearable device, receiving the communication event, or receiving the communication event without a prompt; or when the communication event alert terminal is the wearable device, receiving and prompting, by the wearable device, the communication event; or when the communication event alert terminal is the wearable device, and the wearable device determines, according to location information of the mobile phone and location information of the wearable device, that a distance between the mobile phone and the wearable device is less than a specified value, receiving, by both the mobile phone and the wearable device, the communication event and displaying the communication event to the user, where in this case, the user chooses a terminal that is more convenient for the user, to view the communication event, for more convenient use.

It should be noted that this embodiment is applicable to the first scenario, the second scenario, and a third scenario. In the first scenario, the skipping, by the first terminal or the second terminal, receiving the communication event may be implemented by sending an instruction message, for example, the foregoing communication transfer start instruction message, to a server.

In the third scenario, both the first terminal and the second terminal may receive the communication event, but only the communication event alert terminal displays the communication event to the user; or only the communication event alert terminal receives the communication event and displays the received communication event to the user, and a non communication event alert terminal skips receiving the communication event. For example, a mobile communications module is set to a low power consumption state, and when the terminal needs to receive the communication event, the mobile communications module is woken up. In this case, information is transmitted between the first terminal and the second terminal by using a nonmobile communications network, for example, a BLUETOOTH connection.

Figure 12:
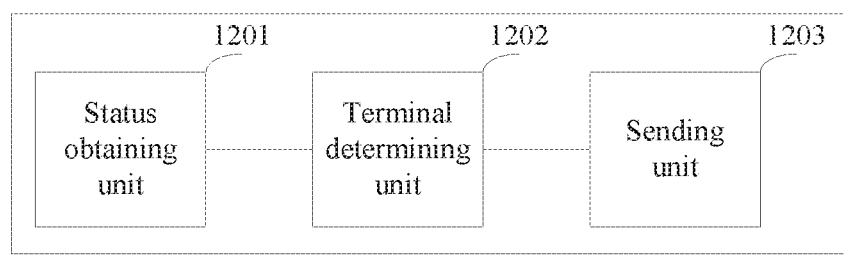
FIG. 12 is a structural block diagram of a communication event transfer apparatus according to an embodiment of the present disclosure.

FIG. 12 is a structural block diagram of a communication event transfer apparatus according to an embodiment of the present disclosure. The communication event transfer apparatus may become an entire first terminal or a part of a first terminal by using software, hardware, or a combination of software and hardware. The communication event transfer apparatus may include a status obtaining unit 1201, a terminal determining unit 1202, and a sending unit 1203.

The status obtaining unit 1201 is configured to obtain a use status of the first terminal and a use status of a second terminal.

The terminal determining unit 1202 is configured to determine either the first terminal or the second terminal as a communication event receiving terminal according to at least one of the use status of the first terminal or the use status of the second terminal that is obtained by the status obtaining unit 1201.

The sending unit 1203 is configured to: when the communication event receiving terminal determined by the terminal determining unit 1202 is the second terminal and a communication event receiving terminal determined last time is the first terminal, send a communication event transfer start instruction message to a server, where the communication event transfer start instruction message is used to instruct the server to forward, to the second terminal, a received communication event to be sent to the first terminal.

Optionally, the sending unit 1203 is further configured to: when the communication event receiving terminal is the first terminal and a communication event receiving terminal determined last time is the second terminal, send a communication event transfer stop instruction message to a server, where the communication event transfer stop instruction message is used to instruct the server to stop forwarding, to the second terminal, a communication event to be sent to the first terminal.

The status obtaining unit 1201 may include an obtaining subunit and a first determining unit. The obtaining subunit is configured to obtain usage data of the first terminal, where the usage data of the first terminal includes at least one of: data about one or more sensors, touchscreen use status data, or communications interface traffic data of the first terminal. The first determining unit is configured to determine, according to the usage data obtained by the obtaining subunit, that the use status of the first terminal is a state of being used by a user or a state of not being used by a user.

The status obtaining unit 1201 may further include a receiving subunit and a second determining subunit. The receiving subunit is configured to receive a notification message that is used to describe the use status of the second terminal and that is sent by the second terminal, where the use status of the second terminal is determined by the second terminal according to usage data of the second terminal, the usage data of the second terminal includes at least one of: data about one or more sensors, touchscreen use status data, or communications interface traffic data, and the use status of the second terminal is a state of being used by a user or a state of not being used by a user. The second determining subunit is configured to obtain the use status of the second terminal according to the notification message.

Further, the terminal determining unit 1202 is configured to: when the use status of the first terminal is a state of being used by a user, determine that the communication event receiving terminal is the first terminal; or when the use status of the second terminal is a state of being used by a user, determine that the communication event receiving terminal is the second terminal; or when both the use status of the first terminal and the use status of the second terminal are a state of being used by a user, determine either the first terminal or the second terminal as the communication event receiving terminal according to identity information of a current user of the first terminal and identity information of a current user of the second terminal.

More further, the terminal determining unit is configured to: when both the use status of the first terminal and the use status of the second terminal are a state of being used by a user, select a terminal whose current-user identity information is the same as preset user identity information, as the communication event receiving terminal; or when both the identity information of the current user of the first terminal and the identity information of the current user of the second terminal are the same as preset user identity information, use the first terminal as the communication event receiving terminal; or when both the identity information of the current user of the first terminal and the identity information of the current user of the second terminal are the same as preset user identity information, determine the communication event receiving terminal according to scenario information of the first terminal.

Figure 13:
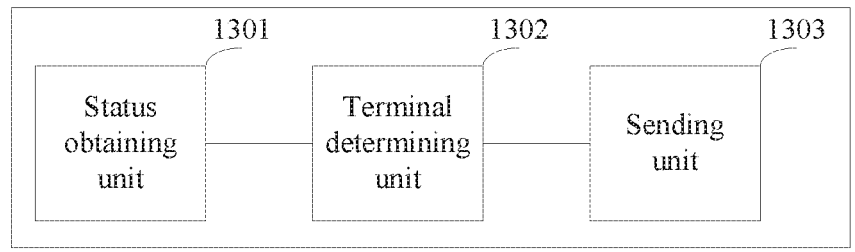
FIG. 13 is a structural block diagram of a communication event processing apparatus according to an embodiment of the present disclosure.

FIG. 13 is a structural block diagram of a communication event processing apparatus according to an embodiment of the present disclosure. The communication event transfer apparatus may become an entire first terminal or a part of a first terminal by using software, hardware, or a combination of software and hardware. The communication event processing apparatus may include a status obtaining unit 1301, a terminal determining unit 1302, and a sending unit 1303.

The status obtaining unit 1301 is configured to obtain a use status of the first terminal and a use status of a second terminal. The terminal determining unit 1302 is configured to determine either the first terminal or the second terminal as a communication event alert terminal according to at least one of the use status of the first terminal or the use status of the second terminal that is obtained by the status obtaining unit 1301, where the communication event alert terminal is configured to receive a communication event to be sent to the first terminal and/or the second terminal and display the communication event to a user. The sending unit 1303 is configured to send a notification message to the second terminal, where the notification message is used to notify the second terminal of information about the communication event alert terminal.

The status obtaining unit 1301 may include an obtaining subunit and a first determining unit. The obtaining subunit is configured to obtain usage data of the first terminal, where the usage data of the first terminal includes at least one of: data about one or more sensors, touchscreen use status data, or communications interface traffic data of the first terminal. The first determining unit is configured to determine, according to the usage data obtained by the obtaining subunit, that the use status of the first terminal is a state of being used by a user or a state of not being used by a user.

The status obtaining unit 1301 may further include a receiving subunit and a second determining subunit. The receiving subunit is configured to receive a notification message that is used to describe the use status of the second terminal and that is sent by the second terminal, where the use status of the second terminal is determined by the second terminal according to usage data of the second terminal, the usage data of the second terminal includes at least one of: data about one or more sensors, touchscreen use status data, or communications interface traffic data, and the use status of the second terminal is a state of being used by a user or a state of not being used by a user. The second determining subunit is configured to obtain the use status of the second terminal according to the notification message.

Further, the terminal determining unit 1302 is configured to: when the use status of the first terminal is a state of being used by a user, determine that the communication event alert terminal is the first terminal; or when the use status of the second terminal is a state of being used by a user, determine that the communication event alert terminal is the second terminal; or when both the use status of the first terminal and the use status of the second terminal are a state of being used by a user, determine either the first terminal or the second terminal as the communication event alert terminal according to identity information of a current user of the first terminal and identity information of a current user of the second terminal.

More further, the terminal determining unit 1302 is configured to: when both the use status of the first terminal and the use status of the second terminal are a state of being used by a user, select a terminal whose current-user identity information is the same as preset user identity information, as the communication event alert terminal; or when both the identity information of the current user of the first terminal and the identity information of the current user of the second terminal are the same as preset user identity information, use the first terminal as the communication event alert terminal; or when both the identity information of the current user of the first terminal and the identity information of the current user of the second terminal are the same as preset user identity information, determine the communication event alert terminal according to scenario information of the first terminal.

The apparatus may further include: an execution module, configured to: when the communication event alert terminal is the second terminal, skip receiving a communication event, or receive a communication event without a prompt; or when the communication event alert terminal is the second terminal, and the first terminal determines, according to location information of the first terminal and location information of the second terminal, that a distance between the first terminal and the second terminal is less than a specified value, receive the communication event and display the communication event to the user.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A communication event transfer method, wherein the method comprises:
   obtaining, by a first terminal, a use status of the first terminal and a use status of a second terminal;
   determining, by the first terminal, either the first terminal or the second terminal as a second communication event receiving terminal according to at least one of the use status of the first terminal or the use status of the second terminal;
   sending, by the first terminal, a communication event transfer start instruction message to a server when the second communication event receiving terminal is the second terminal and a first communication event receiving terminal previously determined is the first terminal, wherein the communication event transfer start instruction message instructs the server to forward, to the second terminal, a first received communication event to be sent to the first terminal; and sending, by the first terminal, a communication event transfer stop instruction message to the server when the second communication event receiving terminal is the first terminal and the first communication event receiving terminal is the second terminal, and wherein the communication event transfer stop instruction message instructs the server to stop forwarding, to the second terminal, one or more communication events to be sent to the first terminal.

2. The method according to claim 1, wherein obtaining, by the first terminal, the use status of the first terminal comprises:

obtaining, by the first terminal, usage data of the first terminal, wherein the usage data of the first terminal comprises at least one of data about one or more sensors, touchscreen use status data, and communications interface traffic data of the first terminal; and determining, by the first terminal according to the obtained usage data of the first terminal, that the use status of the first terminal corresponds to a state of being used by a user or a state of not being used by a user.

3. The method according to claim 1, wherein obtaining, by the first terminal, the use status of the second terminal comprises:

receiving, by the first terminal from the second terminal, a notification message that indicates the use status of the second terminal, wherein the use status of the second terminal is based on usage data of the second terminal, wherein the usage data of the second terminal comprises at least one of: data about one or more sensors, touchscreen use status data, or communications interface traffic data of the second terminal, and wherein the use status of the second terminal comprises a state of being used by a user or a state of not being used by a user; and obtaining, by the first terminal, the use status of the second terminal according to the notification message.

4. The method according to claim 1, wherein determining, by the first terminal, either the first terminal or the second terminal as the second communication event receiving terminal according to the at least one of the use status of the first terminal or the use status of the second terminal comprises:

determining, by the first terminal, that the second communication event receiving terminal is the first terminal when the use status of the first terminal corresponds to a state of being used;

determining, by the first terminal, that the second communication event receiving terminal is the second terminal when the use status of the second terminal corresponds to the state of being used; or determining, by the first terminal, either the first terminal or the second terminal as the second communication event receiving terminal according to identity information of a current user of the first terminal and identity information of a current user of the second terminal when both the use status of the first terminal and the use status of the second terminal correspond to the state of being used.

5. The method according to claim 4, wherein determining, by the first terminal, either the first terminal or the second terminal as the second communication event receiving terminal according to the identity information of the current user of the first terminal and the identity information of the current user of the second terminal comprises:

selecting, by the first terminal, a terminal whose current-user identity information is the same as preset user identity information as the second communication event receiving terminal;

using, by the first terminal, the first terminal as the second communication event receiving terminal when both the identity information of the current user of the first terminal and the identity information of the current user of the second terminal are the same as the preset user identity information; or determining, by the first terminal, the second communication event receiving terminal according to scenario information of the first terminal when both the identity information of the current user of the first terminal and the identity information of the current user of the second terminal are the same as the preset user identity information.

6. The method according to claim 1, wherein the method further comprises:

obtaining, by the first terminal, a communication number currently used by the second terminal when a communication number used by the second terminal changes after the first terminal sends the communication event transfer start instruction message to the server; and sending, by the first terminal, a communication number change instruction message to the server, and wherein the communication number change instruction message instructs the server to forward, to the second terminal by using the communication number currently used by the second terminal, a second received communication event to be sent to the first terminal.

7. The method according to claim 1, wherein the method comprises:

obtaining, by the first terminal, the scenario information of the first terminal; and determining, by the first terminal according to the use status of the first terminal, the use status of the second terminal, and the scenario information, whether to forward the first received communication event to the second terminal.

8. A communication event processing method, wherein the method comprises:

obtaining, by a first terminal, a use status of the first terminal and a use status of a second terminal, wherein obtaining the use status of the first terminal comprises:

obtaining, by the first terminal, usage data of the first terminal, wherein the usage data comprises at least one of data about one or more sensors, touchscreen use status data, and communications interface traffic data of the first terminal; and determining, by the first terminal according to the obtained usage data, that the use status of the first terminal corresponds to a state of being used by a user or a state of not being used by a user;

determining, by the first terminal, either the first terminal or the second terminal as a communication event alert terminal according to at least one of the use status of the first terminal or the use status of the second terminal, wherein the first terminal or the second terminal determined to be the communication event alert terminal is configured to receive a communication event to be sent to the other of the first terminal and the second terminal and to display the communication event to a user; and sending, by the first terminal, a notification message to the second terminal, wherein the notification message includes information about the communication event alert terminal.

9. The method according to claim 8, wherein obtaining, by the first terminal, the use status of the second terminal comprises:
receiving, by the first terminal from the second terminal, a notification message that indicates the use status of the second terminal, wherein the use status of the second terminal is based on usage data of the second terminal, wherein the usage data of the second terminal comprises at least one of: data about one or more sensors, touchscreen use status data, or communications interface traffic data of the second terminal, and wherein the use status of the second terminal is a state of being used by a user or a state of not being used by a user; and
obtaining, by the first terminal, the use status of the second terminal according to the notification message.

10. The method according to claim 8, wherein determining, by the first terminal, either the first terminal or the second terminal as the communication event alert terminal according to the at least one of the use status of the first terminal or the use status of the second terminal comprises:
determining, by the first terminal, that the communication event alert terminal is the first terminal when the use status of the first terminal corresponds to a state of being used;
determining, by the first terminal, that the communication event alert terminal is the second terminal when the use status of the second terminal corresponds to the state of being used; or
determining, by the first terminal, either the first terminal or the second terminal as the communication event alert terminal according to identity information of a current user of the first terminal and identity information of a current user of the second terminal when both the use status of the first terminal and the use status of the second terminal correspond to the state of being used.

11. The method according to claim 10, wherein determining, by the first terminal, either the first terminal or the second terminal as the communication event alert terminal according to the identity information of the current user of the first terminal and the identity information of the current user of the second terminal comprises:
selecting, by the first terminal, a terminal whose current-user identity information is the same as preset user identity information as the communication event alert terminal; using, by the first terminal, the first terminal as the communication event alert terminal when both the identity information of the current user of the first terminal and the identity information of the current user of the second terminal are the same as the preset user identity information; or
determining, by the first terminal, the communication event alert terminal according to scenario information of the first terminal when both the identity information of the current user of the first terminal and the identity information of the current user of the second terminal are the same as the preset user identity information.

12. The method according to claim 8, wherein the method further comprises:
skipping, by the first terminal, receiving the communication event when the communication event alert terminal is the second terminal;
receiving, by the first terminal, the communication event without a prompt when the communication event alert terminal is the second terminal; or
when the communication event alert terminal is the second terminal, and the first terminal determines, according to location information of the first terminal and location information of the second terminal, that a distance between the first terminal and the second terminal is less than a specified value:
receiving, by the first terminal, the communication event; and
displaying the communication event.

13. A first terminal, comprising:
a memory; and
a processor coupled to the memory,
wherein the memory is configured to store a software program executable by the processor to:
obtain a use status of the first terminal and a use status of a second terminal;
determine either the first terminal or the second terminal as a second communication event receiving terminal according to at least one of the use status of the first terminal or the use status of the second terminal;
send a communication event transfer start instruction message to a server when the second communication event receiving terminal is the second terminal and a first communication event receiving terminal determined previously is the first terminal, wherein the communication event transfer start instruction message instructs the server to forward, to the second terminal, a received communication event to be sent to the first terminal; and
send a communication event transfer stop instruction message to the server when the second communication event receiving terminal is the first terminal and the first communication event receiving terminal is the second terminal, wherein the communication event transfer stop instruction message instructs the server to stop forwarding, to the second terminal, one or more communication events to be sent to the first terminal.

14. The first terminal according to claim 13, wherein the software program is executable by the processor to:
obtain usage data of the first terminal, wherein the usage data of the terminal comprises at least one of data about one or more sensors, touchscreen use status data, and communications interface traffic data of the first terminal; and
determine, according to the obtained usage data, that the use status of the first terminal corresponds to a state of being used or a state of not being used.

15. The first terminal according to claim 13, wherein the software program is executable by the processor to:
receive a notification message from the second terminal, wherein the notification terminal indicates the use status of the second terminal, wherein the use status of the second terminal is determined based on usage data of the second terminal, wherein the usage data of the second terminal comprises at least one of: data about one or more sensors, touchscreen use status data, or communications interface traffic data of the second terminal, and wherein the use status of the second terminal comprises a state of being used by a user or a state of not being used by a user; and
obtain the use status of the second terminal according to the notification message.

16. The first terminal according to claim 13, wherein the software program is executable by the processor to:
- determine that the second communication event receiving terminal is the first terminal when the use status of the first terminal corresponds to a state of being used;
- determine that the second communication event receiving terminal is the second terminal when the use status of the second terminal corresponds to the state of being used; and
- determine either the first terminal or the second terminal as the second communication event receiving terminal according to identity information of a current user of the first terminal and identity information of a current user of the second terminal when both the use status of the first terminal and the use status of the second terminal correspond to the state of being used.

17. The first terminal according to claim 16, wherein the software program is executable by the processor to:
- select a terminal whose current-user identity information is the same as preset user identity information as the second communication event receiving terminal; use the first terminal as the second communication event receiving terminal when both the identity information of the current user of the first terminal and the identity information of the current user of the second terminal are the same as preset user identity information; or
- determine the second communication event receiving terminal according to scenario information of the first terminal when both the identity information of the current user of the first terminal and the identity information of the current user of the second terminal are the same as the preset user identity information.

\* \* \* \* \*